United States Patent
Miyoshi et al.

(10) Patent No.: US 7,935,275 B2
(45) Date of Patent: May 3, 2011

(54) RESIN MOLDINGS AND CONDUCTIVE RESIN COMPOSITION

(75) Inventors: Takaaki Miyoshi, Kimitsu (JP); Kazuya Noda, Sodegaura (JP); Mitsuhiro Horio, Sodegaura (JP); Yuuji Yoshinaga, Sodegaura (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 286 days.

(21) Appl. No.: 10/553,209

(22) PCT Filed: Apr. 16, 2004

(86) PCT No.: PCT/JP2004/005464
§ 371 (c)(1),
(2), (4) Date: Oct. 13, 2005

(87) PCT Pub. No.: WO2004/092275
PCT Pub. Date: Oct. 28, 2004

(65) Prior Publication Data
US 2006/0199903 A1    Sep. 7, 2006

(30) Foreign Application Priority Data

Apr. 18, 2003  (JP) ................................. 2003-113589
Apr. 24, 2003  (JP) ................................. 2003-119814

(51) Int. Cl.
*C08K 3/34* (2006.01)
*C08K 7/04* (2006.01)
*C08L 79/00* (2006.01)
*C08L 71/12* (2006.01)

(52) U.S. Cl. ........ 252/502; 252/511; 524/456; 524/495; 524/505; 525/92 B; 525/92 D

(58) Field of Classification Search .................. 252/502, 252/511; 524/456, 495, 505; 525/92 B, 525/92 D
See application file for complete search history.

(56) References Cited

U.S. PATENT DOCUMENTS

| 5,474,853 A | 12/1995 | Watanabe |
| 2001/0031831 A1 | 10/2001 | Miyoshi et al. |
| 2003/0116757 A1 | 6/2003 | Miyoshi et al. |

FOREIGN PATENT DOCUMENTS

| EP | 0 585 056 A2 | 3/1994 |
| JP | 6-240130 | 8/1994 |
| JP | 6-313045 | 11/1994 |
| JP | 2001-302905 | 10/2001 |
| JP | 2002-194093 | 7/2002 |
| JP | 2002-206054 | 7/2002 |
| JP | 2003-64255 | 3/2003 |
| JP | 2004-143239 | 5/2004 |
| WO | WO 01/081473 | 11/2001 |

OTHER PUBLICATIONS

European Search Report dated Feb. 21, 2008.

*Primary Examiner* — Ana L Woodward
(74) *Attorney, Agent, or Firm* — Staas & Halsey LLP

(57) ABSTRACT

A shaped resin article comprising a polyamide (A) (comprising at least two different polyamide components), a polyphenylene ether (B) and a partially hydrogenated block copolymer (C) (obtained by partially hydrogenating a block copolymer comprising an aromatic vinyl polymer block and a conjugated diene polymer block) including a block copolymer (C-1) having a number average molecular weight of from 200,000 to 300,000, wherein (A) is present as a continuous phase in which (B) is dispersed to form a dispersed phase, and (C) is present in the continuous phase of (A) and/or the dispersed phase of (B), wherein the surface area of the polyamide (A) exposed on the overall surface of the shaped resin article is at least 80%, based on the surface area of the shaped resin article. A conductive resin composition comprising a polyamide (A), a polyphenylene ether (B), a partially hydrogenated block copolymer (C) comprising an aromatic vinyl polymer block and a conjugated diene polymer block, a conductive carbonaceous material (D) and wollastonite particles (E).

12 Claims, No Drawings

RESIN MOLDINGS AND CONDUCTIVE RESIN COMPOSITION

BACKGROUND OF THE INVENTION

1. Field of the Invention

The present invention relates to a shaped resin article. More particularly, the present invention is concerned with a shaped resin article comprising: a polyamide (A) comprising at least two different polyamide components, a polyphenylene ether (B), and a specific partially hydrogenated block copolymer (C), wherein polyamide (A) is present as a continuous phase in which polyphenylene ether (B) is dispersed to form a dispersed phase, and partially hydrogenated block copolymer (C) is present in at least one phase selected from the group consisting of the continuous phase of polyamide (A) and the dispersed phase of polyphenylene ether (B), wherein polyamide (A) is exposed on the surface of the shaped resin article so that the total area of the polyamide (A) exposed on the surface of the shaped resin article is at least 80%, based on the surface area of the shaped resin article. The shaped resin article of the present invention is advantageous not only in that the shaped resin article has excellent matte surface, but also in that the shaped resin article has excellent strength of adhesion to a coating formed on the shaped resin article (which strength of adhesion is hereinafter, referred to simply as "coating adhesion strength"), and such a coating formed on the shaped resin article has excellent sharpness of an image reflected therein (i.e., the coating has excellent luster). The present invention is also concerned with a conductive resin composition comprising: a polyamide (A), a polyphenylene ether (B), a specific block copolymer (C), a conductive carbonaceous material (D), and wollastonite particles (E). By the use of the conductive resin composition of the present invention, it becomes possible to produce a shaped article which is advantageous not only in that the shaped article has excellent matte surface, but also in that the shaped article has excellent coating adhesion strength, and a coating formed on the shaped article has excellent sharpness of an image reflected therein. Further, the produced shaped article has a satisfactorily low coefficient of linear expansion, which is especially advantageous in the field of large shaped articles, such as an automobile fender and an automobile back door. The shaped resin article of the present invention and the shaped article produced from the conductive resin composition of the present invention can be advantageously used in a wide variety of fields, e.g., not only in a field of exterior parts for automobiles, but also in the fields of electric and electronic parts, parts of office automation machines, mechanical parts, and electric and interior parts of motorcycles and automobiles.

2. Prior Art

Polyphenylene ethers not only have excellent mechanical properties, excellent electrical properties (such as dielectric constant and dielectric dissipation factor) and excellent heat resistance, but also have excellent dimensional stability. Therefore, polyphenylene ethers have been used in a wide variety of fields. However, the moldability of a polyphenylene ether is poor. For improving the moldability of a polyphenylene ether, Examined Japanese Patent Publication No. Sho 45-997 discloses a technique in which a polyamide is added to a polyphenylene ether, to thereby obtain a polyamide-polyphenylene ether alloy. Further various new techniques relating to polyamide-polyether alloys are proposed in, for example, U.S. Pat. Nos. 4,315,086, 4,732,938 and 4,659,760. Nowadays, polyamide-polyether alloys are used in a very wide variety of fields, such as exterior parts for automobiles.

Many of exterior parts of automobiles are usually coated. Therefore, in the choice of a material for exterior parts of automobiles, the strength of adhesion of a material to a coating (which strength of adhesion is hereinafter, referred to simply as "coating adhesion strength") is an important factor.

Conventionally, various techniques have been proposed for imparting coating adhesion strength to a polyamide-polyphenylene ether alloy. For example, Unexamined Japanese Patent Application Laid-Open Specification No. Hei 8-109324 (corresponding to U.S. Pat. No. 5,554,693) discloses a technique in which a specific terpene phenol resin is added to a polyamide-polyphenylene ether alloy so as to improve the coating adhesion strength of the alloy. Further, Unexamined Japanese Patent Application Laid-Open Specification No. Hei 3-143571 discloses a technique in which a shaped resin article is treated with a surfactant, thereby improving the coating adhesion strength of the shaped resin article without precoating of the shaped article with a primer.

However, each of the above-mentioned techniques poses a problem in that an additive is used to improve the coating adhesion strength of the alloy, thereby causing disadvantages in that the heat resistance of the alloy gets lowered, and in that the coated shaped particle of the alloy absorbs moisture. Therefore, there has been a market demand for a technique for improving the coatability of a shaped resin article without the use of an additive.

Further, as one of the properties which are required of large shaped articles (such as an automobile fender and an automobile back door), there can be mentioned a low coefficient of linear expansion. In an automobile, there is provided a gap between an automobile fender and a door, which gap is necessary for opening and closing the door. When an automobile fender is produced from a material having a high coefficient of linear expansion, a disadvantage is caused in that the size of the above-mentioned gap changes depending on the ambient temperature. Therefore, it has been desired to improve the coefficient of linear expansion of a material used for producing the above-mentioned large shaped articles.

In general, the coefficient of linear expansion of a material can be improved by adding an organic or inorganic filler. However, when an organic or inorganic filler is added to a material, a shaped article produced from the material is disadvantageous not only in that the organic or inorganic filler is likely to be biasedly present near the surface of the shaped article, but also in that the coating adhesion strength is lowered, and a coating formed on the shaped article has poor luster. Therefore, it has been desired to improve simultaneously the coefficient of linear expansion and coating adhesion strength of a shaped article, and the luster of a coating formed on the shaped article.

SUMMARY OF THE INVENTION

In this situation, the present inventors have made extensive and intensive studies with a view toward developing, without the use of any of the above-mentioned additives, a polyamide-polyphenylene ether alloy which can be used for producing a shaped article which is advantageous not only in that the shaped article has excellent matte surface, but also in that the shaped article has excellent coating adhesion strength, and a coating formed on the shaped article has excellent sharpness of an image reflected therein. As a result, it has unexpectedly been found that the above-mentioned object can be achieved by a shaped resin article comprising a polyamide, a polyphenylene ether and a partially hydrogenated aromatic vinyl/conjugated diene block copolymer, wherein the area of polyamide exposed on the surface of the shaped resin article is increased to a specific level. Further, the present inventors have found that an excellent shaped article can be produced, without the use of an additive, from a conductive resin composition comprising a polyamide (A), a polyphenylene ether (B), a specific block copolymer (C), a conductive carbonaceous material (D) and wollastonite particles (E). Specifically, a shaped article produced from the conductive resin composition is advantageous not only in that the shaped article has excellent matte surface, but also in that the shaped article has excellent coating adhesion strength, and a coating formed on the shaped article has excellent sharpness of an image reflected therein. Further, such a shaped article has an advantageously low coefficient of linear expansion. Based on these findings, the present invention has been completed.

Accordingly, it is an object of the present invention to provide a shaped resin article which is advantageous not only in that the shaped resin article has excellent matte surface, but also in that the shaped resin article has excellent coating adhesion strength, and a coating formed on the shaped resin article has excellent sharpness of an image reflected therein.

It is another object of the present invention to provide a conductive resin composition which enables the production of a shaped resin article which is advantageous in that the shaped article has excellent matte surface, in that the shaped article has excellent coating adhesion strength, and a coating formed on the shaped article has excellent sharpness of an image reflected therein, and in that the shaped article has an advantageously low coefficient of linear expansion.

The foregoing and other objects, features and advantages of the present invention will be apparent from the following detailed description and the appended claims.

DETAILED DESCRIPTION OF THE INVENTION

According to the present invention, there is provided a shaped resin article comprising:
a polyamide (A) comprising at least two different polyamide components,
a polyphenylene ether (B), and
one or more partially hydrogenated block copolymers (C), each independently obtained by partially hydrogenating an unhydrogenated block copolymer comprising at least one aromatic vinyl polymer block comprised mainly of aromatic vinyl monomer units, and at least one conjugated diene polymer block comprised mainly of conjugated diene monomer units, the partially hydrogenated block copolymers (C) including at least one partially hydrogenated block copolymer (C-1) having a number average molecular weight of from 200,000 to 300,000,
wherein the polyamide (A) is present as a continuous phase in which the polyphenylene ether (B) is dispersed to form a dispersed phase, and the partially hydrogenated block copolymer (C) is present in at least one phase selected from the group consisting of the continuous phase of the polyamide (A) and the dispersed phase of the polyphenylene ether (B),
wherein the polyamide (A) is exposed on the surface of the shaped resin article so that the surface area of the polyamide (A) exposed on the overall surface of the shaped resin article is at least 80%, based on the surface area of the shaped resin article.

For easier understanding of the present invention, the essential features and various preferred embodiments of the present invention are enumerated below.

1. A shaped resin article comprising:
a polyamide (A) comprising at least two different polyamide components,
a polyphenylene ether (B), and
one or more partially hydrogenated block copolymers (C), each independently obtained by partially hydrogenating an unhydrogenated block copolymer comprising at least one aromatic vinyl polymer block comprised mainly of aromatic vinyl monomer units, and at least one conjugated diene polymer block comprised mainly of conjugated diene monomer units, the partially hydrogenated block copolymers (C) including at least one partially hydrogenated block copolymer (C-1) having a number average molecular weight of from 200,000 to 300,000,
wherein the polyamide (A) is present as a continuous phase in which the polyphenylene ether (B) is dispersed to form a dispersed phase, and the partially hydrogenated block copolymer (C) is present in at least one phase selected from the group consisting of the continuous phase of the polyamide (A) and the dispersed phase of the polyphenylene ether (B),
wherein the polyamide (A) is exposed on the surface of the shaped resin article so that the surface area of the polyamide (A) exposed on the overall surface of the shaped resin article is at least 80%, based on the surface area of the shaped resin article.

2. The shaped resin article according to item 1 above, wherein the polyamide (A) comprises at least two different polyamide components having their respective different viscosities.

3. The shaped resin article according to item 1 above, wherein the component (A) comprises polyamide 6,6 and a polyamide other than polyamide 6,6.

4. The shaped resin article according to item 3 above, wherein the polyamide other than polyamide 6,6 is polyamide 6.

5. The shaped resin article according to item 3 above, wherein the polyamide other than polyamide 6,6 is a polyamide comprising recurring units, each independently represented by the following formula (1):

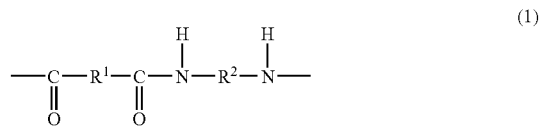

wherein each of $R^1$ and $R^2$ independently represents a $C_3$-$C_{14}$ alkylene group or a $C_6$-$C_9$ arylene group, with the proviso that $R^1$ and $R^2$ are not simultaneously a $C_6$ alkylene group or a $C_6$ arylene group.

6. The shaped resin article according to item 1 above, wherein the polyamide (A) comprises at least one polyimide component having a terminal amino group content of from $1\times10^{-5}$ mol/g to $4\times10^{-5}$ mol/g.

7. The shaped resin article according to item 1 above, wherein the polyphenylene ether (B) contains relatively high molecular weight polyphenylene ether molecules, each independently having a molecular weight of 200,000 or more, and relatively low molecular weight polyphenylene ether molecules, each independently having a molecular weight of 5,000 or less, wherein the weight ratio of the relatively high molecular weight polyphenylene ether molecules to the relatively low molecular weight polyphenylene ether molecules is 0.35 or less.

8. The shaped resin article according to item 1 above, wherein the polyphenylene ether (B) contains relatively high molecular weight polyphenylene ether molecules, each independently having a molecular weight of 200,000 or more, and relatively low molecular weight polyphenylene ether molecules, each independently having a molecular weight of 5,000 or less, wherein the amount of the relatively low molecular weight polyphenylene ether molecules and the amount of the relatively high polyphenylene ether molecules are, respectively, 5% by weight or less and 2% by weight or less, based on the weight of the polyphenylene ether resin (B).

9. The shaped resin article according to item 1 above, wherein the one or more partially hydrogenated block copolymers (C) further include at least one partially hydrogenated block copolymer (C-2) having a number average molecular weight of from 50,000 to 150,000.

10. The shaped resin article according to item 9 above, wherein the at least one partially hydrogenated block copolymer (C-1) and the at least one partially hydrogenated block copolymer (C-2) collectively include:
    at least one partially hydrogenated block copolymer having a high aromatic vinyl monomer unit content, which is obtained by partially hydrogenating an unhydrogenated block copolymer in which the at least one aromatic vinyl polymer block is present in an amount of from 60 to 90% by weight, based on the weight of the unhydrogenated block copolymer, and
    at least one partially hydrogenated block copolymer having a low aromatic vinyl monomer unit content, which is obtained by partially hydrogenating an unhydrogenated block copolymer in which the at least one aromatic vinyl polymer block is present in an amount of from 20 to less than 60% by weight, based on the weight of the unhydrogenated block copolymer, and
    wherein the total amount of the aromatic vinyl polymer blocks present in the hydrogenated block copolymers (C-1) and (C-2) is 30 to 40% by weight, based on the total weight of the hydrogenated block copolymers (C-1) and (C-2).

11. The shaped resin article according to item 1 above, which further comprises at least one carbonaceous material (D) selected from the group consisting of a conductive carbon black, carbon fibers and carbon nanotubes, and which is produced by melt-kneading a master-batch comprising the polyamide (A) having dispersed therein the carbonaceous material (D) with the polyphenylene ether (B), the one or more partially hydrogenated block copolymers (C), and optionally at least one member selected from the group consisting of an additional amount of the polyamide (A) and an additional amount of the carbonaceous material (D).

12. The shaped resin article according to item 1 above, which further comprises (E) wollastonite particles having an average particle diameter of from 2 to 9 µm.

13. The shaped resin article according to item 12 above, wherein the wollastonite particles (E) have at least two different aspect ratios.

14. The shaped resin article according to item 1 above, which is a pellet.

15. The shaped resin article according to item 1 above, which is an automobile exterior part.

16. A conductive resin composition comprising:
    a polyamide (A),
    a polyphenylene ether (B),
    a block copolymer (C) comprising at least one aromatic vinyl polymer block comprised mainly of aromatic vinyl monomer units, and at least one conjugated diene polymer block comprised mainly of conjugated diene monomer units,
    a conductive carbonaceous material (D), and
    wollastonite particles (E).

17. The conductive resin composition according to item 16 above, which is produced by melt-kneading a masterbatch comprising the polyamide (A) having dispersed therein the carbonaceous material (D) with the polyphenylene ether (B), the one or more partially hydrogenated block copolymers (C), the wollastonite particles (E), and optionally at least one member selected from the group consisting of an additional amount of the polyamide (A) and an additional amount of the carbonaceous material (D), and wherein the carbonaceous material (D) is at least one member selected from the group consisting of a conductive carbon black, carbon fibers and carbon nanotubes.

18. The conductive resin composition according to item 16 above, wherein the wollastonite particles (E) have an average diameter of from 2 to 9 µm.

19. The conductive resin composition according to item 16 above, wherein the wollastonite particles (E) include particles having an aspect ratio of 5 or more and particles having an aspect ratio of less than 5, wherein the amount of the wollastonite particles (E) having an aspect ratio of 5 or more is 50% by weight or more, based on the total weight of the wollastonite particles (E).

Hereinbelow, the present invention is described in detail.

In one embodiment of the present invention, there is provided a shaped resin article comprising:
    a polyamide (A) comprising at least two different polyamide components,
    a polyphenylene ether (B), and one or more specific partially hydrogenated block copolymers (C),
    wherein the polyamide (A) is present as a continuous phase in which the polyphenylene ether (B) is dispersed to form a dispersed phase, and the partially hydrogenated block copolymer (C) is present in at least one phase selected from the group consisting of the continuous phase of the polyamide (A) and the dispersed phase of the polyphenylene ether (B),
    wherein the polyamide (A) is exposed on the surface of the shaped resin article so that the surface area of the polyamide (A) exposed on the overall surface of the shaped resin article is at least 80%, based on the surface area of the shaped resin article.

With respect to the type of polyamide (A) which can be used in the shaped resin article of the present invention, there is no particular limitation so long as it is a polymer having amide {—NH—C(=O)—} linkages in the recurring units thereof.

In general, a polyamide is obtained by, for example, a ring opening polymerization of a lactam, a condensation polymerization of a diamine and a dicarboxylic acid, or a condensation polymerization of an ω-aminocarboxylic acid. However, in the present invention, the method for obtaining a polyamide is not limited to these examples.

Examples of diamines mentioned above include aliphatic diamines, alicyclic diamines and aromatic diamines. Specifically, there can be mentioned tetramethylenediamine, hexamethylenediamine, undecamethylenediamine, dodecamethylenediamine, tridecamethylenediamine, 2,2,4-trimethylhexamethylenediamine, 2,4,4-trimethylhexamethylenediamine, 5-methylnonamethylenediamine, 1,3-bisaminomethylcyclohexane, 1,4-bisaminomethylcyclohexane, m-phenylenediamine, p-phenylenediamine, m-xylylenediamine and p-xylylenediamine.

Examples of dicarboxylic acids include aliphatic dicarboxylic acids, alicyclic dicarboxylic acids and aromatic dicarboxylic acids. Specifically, there can be mentioned adipic acid, suberic acid, azelaic acid, sebacic acid, dodecanoic diacid, 1,1,3-tridecanoic diacid, 1,3-cyclohexane dicarboxylic acid, terephthalic acid, isophthalic acid, naphthalene dicarboxylic acid and a dimer acid.

Specific examples of lactams include ∈-caprolactam, enanthlactam and ω-laurolactam.

Further, specific examples of ω-aminocarboxylic acids include ∈-aminocaproic acid, 7-aminoheptanoic acid, 8-aminooctanoic acid, 9-aminononanoic acid, 11-aminoundecanoic acid, 12-aminododecanoic acid and 13-aminotridecanoic acid.

In the present invention, the polyamide may either be a homopolymer obtained from any of the above-mentioned compounds (i.e., lactams, diamines, dicarboxylic acids and ω-aminocarboxylic acids), or a copolymer obtained by subjecting a mixture of at least two types of the above-mentioned compounds to a condensation polymerization.

In the present invention, it is also preferred to use a polyamide obtained by a method in which one or more of the above-mentioned compounds (i.e., lactams, diamines, dicarboxylic acids and ω-aminocarboxylic acids) are polymerized in a polymerization reactor to thereby obtain a low molecular weight oligomer, and the obtained oligomer is subjected to further polymerization in an extruder or the like, to thereby obtain a high molecular weight polymer.

Examples of polyamides which can be advantageously used in the present invention include polyamide 6, polyamide 6,6, polyamide 4,6, polyamide 11, polyamide 12, polyamide 6,10, polyamide 6,12, polyamide 6/6,6, polyamide 6/6,12, polyamide MXD (m-xylylenediamine), 6, polyamide 6,T, polyamide 6,I, polyamide 6/6,T, polyamide 6/6,I, polyamide 6,6/6,T, polyamide 6,6/6,I, polyamide 6/6,T/6,I, polyamide 6,6/6,T/6,I, polyamide 6/12/6,T, polyamide 6,6/12/6,T, polyamide 6/12/6,I and polyamide 6,6/12/6,I. Further, it is also possible to use a polyamide product obtained by blending or copolymerizing a plurality of different polyamides using an extruder or the like.

In the shaped resin article of the present invention, as polyamide (A), it is necessary to use two or more different polyamide components, and it is preferred to use a mixture of two or more different types of polyamide components having different viscosities. As examples of such polyamide mixtures, there can be mentioned a polyamide mixture containing a polyamide component having a viscosity of 80 ml/g and a polyamide component having a viscosity of 150 ml/g, and a polyamide mixture containing a polyamide component having a viscosity of 120 ml/g and a polyamide component having a viscosity of 115 ml/g, wherein each of the viscosities of the polyamide components is measured in accordance with ISO307 in a 96% sulfuric acid. When a polyamide mixture containing polyamide components having different viscosities is used as polyamide (A), it is preferred that the viscosity of the polyamide mixture is in the range of from 90 to 130 ml/g, more advantageously from 100 to 125 ml/g. Whether or not such a polyamide mixture has a viscosity within the above-mentioned range can be confirmed by a method in which polyamide components to be used in a polyamide mixture are dissolved in a 96% sulfuric acid in the same weight ratio as in the polyamide mixture to be prepared, thereby obtaining a solution of the polyamide components, and the viscosity measurement is performed in accordance with ISO307 using the obtained solution of the polyamide components. As described below, by using a combination of polyamide components having different viscosities, it becomes possible to improve the coating adhesion strength of the shaped resin article without sacrificing the mechanical properties of the shaped resin article.

Further, in the present invention, it is preferred that at least one of the polyamide components is polyamide 6,6. The use of polyamide 6,6 as at least one of the polyamide components is advantageous, for example, in that it becomes possible to suppress the lowering of heat resistance of the shaped resin article.

As a polyamide other than polyamide 6,6, it is preferred to use polyamide 6 and/or a polyamide represented by the following formula (1):

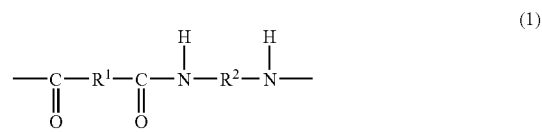

wherein each of $R^1$ and $R^2$ independently represents a $C_3$-$C_{14}$ alkylene group or a $C_6$-$C_9$ arylene group, with the proviso that $R^1$ and $R^2$ are not simultaneously a $C_6$ alkylene group or a $C_6$ arylene group.

Among these polyamides, it is preferred to use at least one polyamide selected from the group consisting of polyamide 4,6, polyamide 6,12, polyamide 6,6/6,I, polyamide 6,6/6,T, polyamide 6,6/6,I/6,T, polyamide 9,T and polyamide 12,T, it is more preferred to use at least one polyamide selected from the group consisting of polyamide 6,12, polyamide 6,6/6,I and polyamide 6,6/6,T, and it is most preferred to use polyamide 6,12 and/or polyamide 6,6/6,I.

When a combination of polyamide 6,6 and a polyamide other than polyamide 6,6 is used as polyamide (A), the amounts of polyamide 6,6 and the polyamide other than polyamide 6,6 can be appropriately selected; however, the amount of polyamide 6,6 is preferably in the range of from 99 to 30% by weight, more preferably from 90 to 45% by weight, most preferably from 80 to 50% by weight, based on the weight of polyamide (A).

Further, it is preferred that polyamide (A) used in the shaped resin article of the present invention comprises at least one polyamide having a terminal amino group content of from $1\times10^{-5}$ to $4\times10^{-5}$ mol/g, more advantageously from $2\times10^{-5}$ to $3\times10^{-5}$ mol/g. In such a case, there is no particular limitation with respect to the terminal carboxyl group content; however, it is preferred that the terminal carboxyl group content is at least $5\times10^{-5}$ mol/g or more, more advantageously from $6\times10^{-5}$ to $13\times10^{-5}$ mol/g.

With respect to the above-mentioned terminal group content(s), polyamide (A) may contain a polyamide component which has terminal group content(s) outside the above-mentioned range(s) so long as at least one of the polyamide components used as polyamide (A) has terminal group content(s) within the above-mentioned range(s). Further, it is preferred to use polyamide 6,6 which has terminal group content(s) within the above-mentioned range(s).

With respect to a method for adjusting the terminal group content(s) of a polyamide, any conventional methods which are well known in the art can be used. For example, there can be mentioned a method in which at least one compound selected from the group consisting of a diamine, a monoamine, a dicarboxylic acid and a monocarboxylic acid is added to the reaction system of a polymerization for producing a polyamide so as to obtain a polyamide having a desired terminal group content(s).

Further, in the shaped resin article of the present invention, a conventional metal-containing stabilizer (used for improving the heat stability of a polyamide) as described in Unexamined Japanese Patent Application Laid-Open Specification No. Hei 1-163262 (corresponding to U.S. Pat. No. 4,857,575) may be used without causing any problems.

Among the conventional metal-containing stabilizers, especially preferred are CuI, $CuCl_2$, copper acetate and cerium stearate. Also preferred are halogen salts of alkali metals, such as potassium iodide and potassium bromide. These metal-containing stabilizers can be used individually or in combination.

It is preferred that the metal-containing stabilizer is added to polyamide (A) in an amount of 0.001 to 1 part by weight, relative to 100 parts by weight of polyamide (A).

Further, in the shaped resin article of the present invention, as a stabilizer other than the above-mentioned metal-containing stabilizer, a conventional organic stabilizer can be used without causing any problems. Examples of organic stabilizers include hindered phenol antioxidants, such as Irganox 1098; phosphorus-type stabilizers against processing heat, such as Irgafos 168; lactone-type stabilizers against processing heat, such as HP-136; sulfur-type heat stabilizers; and hindered amine photostabilizers.

Among the above-mentioned organic stabilizers, preferred are hindered phenol antioxidants, phosphorus-type stabilizers against processing heat, and a mixture thereof. The amount of the organic stabilizer is preferably from 0.001 to 1 part by weight, relative to 100 parts by weight of polyamide (A).

Further, any of other conventional additives for a polyamide can be also added to polyamide (A). Such additive(s) can be used in an amount of less than 10 parts by weight, relative to 100 parts by weight of polyamide (A).

Examples of polyphenylene ethers (B) which can be used in the shaped resin article of the present invention include a homopolymer and a copolymer, each independently comprising a structural unit represented by the following formula:

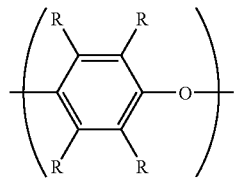

wherein O represents an oxygen atom, and each R independently represents a hydrogen atom, a halogen atom, a primary or secondary $C_1$-$C_3$ lower alkyl group, a $C_6$-$C_9$ aryl group, a $C_1$-$C_3$ haloalkyl group, a $C_1$-$C_3$ aminoalkyl group, a $C_1$-$C_3$ hydrocarbyloxy group or a $C_1$-$C_3$ halohydrocarbyloxy group (in which at least two carbon atoms are present between the halogen atom and the oxygen atom).

Specific examples of polyphenylene ethers which can be used for the shaped resin article of the present invention include poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether). Further examples of polyphenylene ethers include a copolymer of 2,6-dimethylphenol and another phenol (for example, a copolymer of 2,6-dimethylphenol with 2,3,6-trimethylphenol and a copolymer of 2,6-dimethylphenol with 2-methyl-6-butylphenol, which are described in Examined Japanese Patent Application Publication No. Sho 52-17880 (corresponding to U.S. Pat. No. 4,011,200)).

Among the above-mentioned polyphenylene ethers, preferred are poly(2,6-dimethyl-1,4-phenylene ether), a copolymer of 2,6-dimethylphenol with 2,3,6-trimethylphenol, and a mixture thereof.

With respect to the method for producing polyphenylene ether (B) used in the shaped resin article of the present invention, there is no particular limitation, and any conventional methods can be used. For example, there can be mentioned methods as described in U.S. Pat. Nos. 3,306,874, 3,306,875, 3,257,357 and 3,257,358, Unexamined Japanese Patent Application Laid-Open Specification No. Sho 50-51197 (corresponding to U.S. Pat. No. 3,929,930), Examined Japanese Patent Application Publication No. Sho 52-17880, and Unexamined Japanese Patent Application Laid-Open Specification No. Sho 63-152628 (corresponding to U.S. Pat. No. 4,011,200).

With respect to polyphenylene ether (B) which can be used in the shaped resin article of the present invention, the reduced viscosity ($\eta_{sp/c}$) thereof is preferably in the range of from 0.15 to 0.70 dl/g, more preferably from 0.20 to 0.60 dl/g, still more preferably from 0.40 to 0.55 dl/g, as measured at 30° C. with respect to a 0.5 g/dl chloroform solution of the polyphenylene ether.

The use of a mixture of two or more different types of polyphenylene ethers having different reduced viscosities as polyphenylene ether (B) is advantageous in that a balance of the melt fluidity and impact resistance of polyphenylene ether (B) can be improved. As examples of such a mixture, there can be mentioned a mixture of a polyphenylene ether having a reduced viscosity of 0.45 dl/g or less and a polyphenylene ether having a reduced viscosity of 0.50 dl/g or more, and a mixture of a polyphenylene ether having a reduced viscosity of 0.40 dl/g or less and a polyphenylene ether having a reduced viscosity of 0.50 dl/g or more, but the polyphenylene ether mixtures are not limited to those which are exemplified above.

Polyphenylene ether (B) used in the present invention may be in a modified form or may be in the form of a mixture of an unmodified polyphenylene ether and a modified polyphenylene ether. It is especially preferred to use, as polyphenylene ether (B), a mixture of an unmodified polyphenylene ether and a modified polyphenylene ether.

In the present invention, the "modified polyphenylene ether" means a polyphenylene ether which is modified with at least one modifier compound having at least one unsaturated bond selected from the group consisting of a carbon-carbon double bond and a carbon-carbon triple bond and having at least one functional group selected from the group consisting of a carboxylic acid group, an acid anhydride group, an amino group, a hydroxyl group and a glycidyl group, and any of the modified polyphenylene ethers described in WO02/094936 can be used.

The modified polyphenylene ether used for producing the shaped resin article of the present invention may be in the form of a powder or pellets; however, it is preferred that the modified polyphenylene ether is in the form of pellets.

When a mixture of an unmodified polyphenylene ether and a modified polyphenylene ether is used, there is no particular limitation with respect to the amount of the modified polyphenylene ether; however, the amount of the modified polyphenylene ether is preferably from 10 to 95% by weight, more preferably from 30 to 90% by weight, most preferably from 45 to 85% by weight, based on the weight of polyphenylene ether (B).

With respect to the addition of the polyphenylene ether in the production of the shaped resin article of the present invention, it is preferred that a part or all of polyphenylene ether (B) is added to a kneading machine (such as an extruder) in the form of pellets which have been obtained by melt-kneading the polyphenylene ether (B), and the resultant is added to a reaction mixture. By adding polyphenylene ether (B) in the form of such pellets, it becomes possible to improve the self-conveying ability of the polyphenylene ether in the kneading machine (such as an extruder), thereby improving the production rate of the shaped resin article. In addition, the use of polyphenylene ether (B) in the form of the above-mentioned pellets has the following advantage. In general, when it is intended to improve the production rate of a shaped resin article, efficiency of volatilization during the production becomes lowered. Therefore, when the obtained shaped article (e.g., pellets) is used for producing an ultimate molded article using a molding machine, the resultant molded article suffers silver streaks due to the residence of the molten shaped article (e.g., pellets) in a molding machine. However, by the use of the polyphenylene ether in the form of pellets which have been obtained by melt-kneading the polyphenylene ether, it becomes possible to suppress the occurrence of such silver streaks.

Further, it is preferred that polyphenylene ether (B) used in the shaped resin article of the present invention has a specific molecular weight. Specifically, it is preferred that polyphenylene ether (B) comprises a relatively high molecular weight polyphenylene ether having a molecular weight of 200,000 or more and a relatively low molecular weight polyphenylene ether having a molecular weight of 5,000 or less, and satisfies the following requirements (I) and/or (II):

(I) a requirement that the weight ratio of the relatively high molecular weight polyphenylene ether to the relatively low molecular weight polyphenylene ether is 0.35 or less; and/or (II) a requirement that the amounts of the relatively low molecular weight polyphenylene ether and the relatively high molecular weight polyphenylene ether are 5% by weight or less and 2% by weight or less, respectively, based on the weight of polyphenylene ether (B).

It is more preferred that both of the above-mentioned requirements (I) and (II) are satisfied. By adjusting the molecular weight of polyphenylene ether (B) so as to satisfy requirements (I) and/or (II), it becomes possible to further improve the coating adhesion strength of the shaped resin article.

The measurement of the molecular weights of the above-mentioned relatively low molecular weight polyphenylene ether and the relatively high molecular weight polyphenylene ether can be performed by a method comprising the following steps 1) to 3).

1) A shaped resin article in an amount sufficient for the molecular weight measurement is pulverized. Then, the resultant pulverized shaped resin article is immersed in chloroform, and a soluble component thereof is dissolved therein by an ultrasonic washer or the like, thereby obtaining a solution.

2) The solution obtained in step 1) is analyzed by a gel permeation chromatography (GPC) apparatus and an ultraviolet spectrometric detector. From the resultant data, the molecular weight data is obtained using a calibration curve obtained with respect to standard polystyrene samples.

3) The molecular weight data obtained in step 2) is processed by a commercially available GPC processing software, so as to determine the amounts of molecules having molecular weights within a specific range.

In the measurement, it is important to operate the ultraviolet spectrometric detector at a wavelength where an absorption ascribed to the block copolymer(s) is not observed, so as not to detect the block copolymer(s) which elutes concomitantly with polyphenylene ether from the solution. (Measurement conditions: GPC apparatus: GPC SYSTEM 21, manufactured and sold by Showa Denko Co., Japan; detector: UV-41, manufactured and sold by Showa Denko Co., Japan; solvent: chloroform; temperature: 40° C.; columns: columns for the sample (K-G, K-800RL and K-800R) and columns for the reference (K-805L, 2 columns); flow rate: 10 ml/min; wavelength used for detection: 283 nm; and pressure: 15 to 17 kg/cm$^2$.)

The shaped resin article of the present invention may contain a styrene-containing thermoplastic resin in an amount of less than 50 parts by weight, relative to 100 parts by weight of the total of polyamide (A) and polyphenylene ether (B).

Herein, a styrene-containing thermoplastic resin means at least one resin selected from the group consisting of a polystyrene (homopolymer), a rubber-modified polystyrene (HIPS), a styrene-acrylonitrile copolymer (AS resin) and a styrene-rubbery polymer-acrylonitrile copolymer (ABS resin).

Further, any of the conventional stabilizers for a polyphenylene ether can be used in the production of the shaped resin article of the present invention. Examples of conventional stabilizers include metal-containing stabilizers, such as zinc oxide and zinc sulfide; and organic stabilizers, such as a hindered phenol type stabilizer, a phosphorous type stabilizer and a hindered amine type stabilizer. The amount of the stabilizer(s) is preferably less than 5 parts by weight, relative to 100 parts by weight of polyphenylene ether (B).

Furthermore, any of the conventional additives for a polyphenylene ether can be used in the production of the shaped resin article of the present invention in an amount of less than 10 parts by weight, relative to 100 parts by weight of polyphenylene ether (B).

Next, an explanation is given with respect to the partially hydrogenated block copolymer (C) which can be used in the shaped resin article of the present invention.

The partially hydrogenated block copolymer (C) which can be used in the shaped resin article of the present invention is obtained by partially hydrogenating an unhydrogenated block copolymer comprising at least one aromatic vinyl polymer block comprised mainly of aromatic vinyl monomer units, and at least one conjugated diene polymer block comprised mainly of conjugated diene monomer units.

The partially hydrogenated block copolymer (C) includes at least one partially hydrogenated block copolymer (C-1) having a number average molecular weight of from 200,000 to 300,000.

In the present invention, "an aromatic vinyl polymer block comprised mainly of aromatic vinyl monomer units" means an aromatic vinyl polymer block which contains aromatic vinyl monomer units in an amount of at least 50% by weight, based on the weight of the aromatic vinyl polymer block. It is preferred that the aromatic vinyl polymer block contains aromatic vinyl monomer units in an amount of 70% by weight or more, more advantageously 80% by weight or more, most advantageously 90% by weight or more, based on the weight of the aromatic vinyl polymer block.

Similarly, "a conjugated diene polymer block comprised mainly of conjugated diene monomer units" means a conjugated diene polymer block which contains conjugated diene monomer units in an amount of at least 50% by weight, preferably 70% by weight or more, more preferably 80% by weight or more, most preferably 90% by weight or more, based on the weight of the conjugated diene polymer block.

The above-mentioned aromatic vinyl polymer block may be, for example, a copolymer block in which a small amount of conjugated diene monomer units are randomly inserted between the aromatic vinyl polymer units.

Similarly, the above-mentioned conjugated diene polymer block may be, for example, a copolymer block in which a small amount of aromatic vinyl monomer units are randomly inserted between the conjugated diene monomer units.

Specific examples of aromatic vinyl compounds used for forming the aromatic vinyl monomer units include styrene, α-methyl styrene and vinyl toluene. These compounds can be used individually or in combination. Among the above-exemplified compounds, styrene is especially preferred.

Specific examples of conjugated dienes used for forming the conjugated diene monomer units include butadiene, isoprene, piperylene and 1,3-pentadiene. These compounds can be used individually or in combination. Among the above-exemplified compounds, butadiene, isoprene and a mixture thereof are preferred.

With respect to the microstructure of the conjugated diene polymer block of partially hydrogenated block copolymer (C), it is preferred that the 1,2-vinyl bond content or the total content of the 1,2-vinyl bond and the 3,4-vinyl bond is 5 to 80%, more advantageously 10 to 50%, most advantageously 15 to 40%.

With respect to the unhydrogenated block copolymer used for producing partially hydrogenated block copolymer (C), it is preferred that aromatic vinyl polymer block (a) and conjugated diene polymer block (b) have a block configuration selected from the group consisting of a-b, a-b-a and a-b-a-b. The block copolymer may be a mixture of different block copolymers having the above-mentioned block configurations. Among the above-mentioned block configurations, a-b-a and a-b-a-b are more preferred, and a-b-a is most preferred.

Further, it is necessary that the block copolymer used in the present invention be a partially hydrogenated block copolymer.

The "partially hydrogenated block copolymer" herein means a copolymer which is obtained by hydrogenating any of the above-mentioned unhydrogenated block copolymers wherein the degree of hydrogenation of the aliphatic double bonds in the conjugated diene polymer block is more than 0% and less than 100%. The degree of hydrogenation of the partially hydrogenated block copolymer is preferably 50% or more and less than 100%, more preferably 80% or more and less than 100%, most preferably 98% or more and less than 100%.

Further, it is necessary that the partially hydrogenated block copolymer contained in the shaped resin article of the present invention include a partially hydrogenated block copolymer (C-1) having a number average molecular weight of from 200,000 to 300,000. When only a partially hydrogenated block copolymer having a number average molecular weight of less than 200,000 is used, the disadvantage is that the coating adhesion strength of the shaped resin article is lowered. On the other hand, when only a partially hydrogenated block copolymer having a number average molecular weight of more than 300,000 is used, the disadvantage is that the melt fluidity of the resin composition used for producing the shaped resin article is lowered.

In the present invention, the number average molecular weight is measured by a gel permeation chromatography (GPC) apparatus (GPC SYSTEM 21, manufactured and sold by Showa Denko Co., Japan), using an ultraviolet spectrometric detector (UV-41, manufactured and sold by Showa Denko Co., Japan) and a calibration curve obtained with respect to standard polystyrene samples. (Measurement conditions: solvent: chloroform; temperature: 40° C.; columns: columns for the sample (K-G, K-800RL and K-800R) and columns for the reference (K-805L, 2 columns); flow rate: 10 ml/min; wavelength used for detection: 254 nm; and pressure: 15 to 17 kg/cm$^2$.) In the measurement of the number molecular weight, a low molecular weight component formed due to the deactivation of a polymerization catalyst may sometimes be detected, but such a low molecular weight component is ignored in the calculation of the molecular weight. In general, a correctly calculated molecular weight distribution (weight average molecular weight/number average molecular weight ratio) is in the range of from 1.0 to 1.1.

In the shaped resin article of the present invention, as the above-mentioned partially hydrogenated block copolymers (C), it is possible to use a mixture of at least one partially hydrogenated block copolymer (C-1) having a number average molecular weight of from 200,000 to 300,000 and at least one partially hydrogenated block copolymer (C-2) having a number average molecular weight of from 50,000 to 150,000. By using a mixture of partially hydrogenated block copolymers (C-1) and (C-2), it becomes possible to improve the coating adhesion strength of the shaped resin article, and the balance of the impact resistance and melt fluidity of the resin composition used in the production of the shaped resin article.

When a mixture of at least one partially hydrogenated block copolymer (C-1) and at least one partially hydrogenated block copolymer (C-2) is used as partially hydrogenated block copolymers (C), it is preferred that the at least one partially hydrogenated block copolymer (C-1) and the at least one partially hydrogenated block copolymer (C-2) collectively include:

at least one partially hydrogenated block copolymer having a high aromatic vinyl monomer unit content, which is obtained by partially hydrogenating an unhydrogenated block copolymer in which the at least one aromatic vinyl polymer block is present in an amount of from 60 to 90% by weight, based on the weight of the unhydrogenated block copolymer, and at least one partially hydrogenated block copolymer having a low aromatic vinyl monomer unit content, which is obtained by partially hydrogenating an unhydrogenated block copolymer in which the at least one aromatic vinyl polymer block is present in an amount of from 20 to less than 60% by weight, based on the weight of the unhydrogenated block copolymer, wherein the total amount of the aromatic vinyl polymer blocks present in the hydrogenated block copolymers (C-1) and (C-2) is 30 to 40% by weight, based on the total weight of the hydrogenated block copolymers (C-1) and (C-2).

By using such a mixture of at least one partially hydrogenated block copolymer having a high aromatic vinyl monomer unit content and at least one partially hydrogenated block copolymer having a low aromatic vinyl monomer unit content, it becomes possible to obtain a shaped resin article which is improved in respect both of impact resistance and stiffness at high temperatures.

In such a case, it is especially preferred to use partially hydrogenated block copolymer (C-2) (having a number average molecular weight of from 50,000 to 150,000) which has a high aromatic vinyl monomer unit content, and is obtained by partially hydrogenating an unhydrogenated block copolymer in which the aromatic vinyl polymer block(s) is present in an amount of from 60 to 90% by weight, based on the weight of the unhydrogenated block copolymer. Further, with respect to the partially hydrogenated block copolymer having the above-mentioned specific number average molecular weight and the above-mentioned specific aromatic vinyl polymer block content, it is preferred to use a block copolymer having a number average molecular weight and an aromatic vinyl polymer block content such that the number average molecular weight of the aromatic vinyl polymer blocks becomes 20,000 or more.

The number average molecular weight of aromatic vinyl polymer blocks of a block copolymer can be calculated from the number average molecular weight of the block copolymer mentioned above in accordance with the following formula:

$$Mn_{(a)} = \{Mn > a/(a+b)\}/N$$

wherein $Mn_{(a)}$ represents the number average molecular weight of the aromatic vinyl polymer blocks; Mn represents the number average molecular weight of the block copolymer; "a" represents the % by weight of the total of the aromatic vinyl polymer blocks, based on the weight of the block copolymer; "b" represents the % by weight of the total of the conjugated diene polymer blocks, based on the weight of the block copolymer; and N represents the number of the aromatic vinyl polymer blocks in the block copolymer.

The above-mentioned partially hydrogenated block copolymer may be a mixture of different block copolymers so long as each of the block copolymers does not adversely affect the properties of the shaped resin article of the present invention. For example, the block copolymer may be a mixture of block copolymers having different block configurations, a mixture of block copolymers containing different aromatic vinyl monomer units, a mixture of block copolymers containing different conjugated diene monomer units, a mixture of block copolymers having different 1,2-vinyl contents or different total contents of 1,2-vinyl bond and 3,4-vinyl bond, a mixture of block copolymers having different aromatic vinyl monomer unit contents, and a mixture of block copolymers having different degrees of hydrogenation.

The above-mentioned unhydrogenated block copolymer can be produced by any conventional methods. The above-mentioned hydrogenation of an unhydrogenated block copolymer can also be performed by any conventional methods.

In the present invention, it is also preferred to use a modified or partially modified block copolymer or a block copolymer premixed with an oil, which are described in WO02/094936.

The shaped resin article of the present invention may further comprise a carbonaceous material (D). By adding carbonaceous material (D), it becomes possible to use the shaped resin article in application fields where a shaped resin article is required to have conductivity.

Carbonaceous material (D) which can be used in the shaped resin article of the present invention is a carbonaceous filler which is capable of improving the conductivity (i.e., lowering the volume resistivity) of the shaped resin article by addition thereof.

Among such carbonaceous materials, especially preferred are a conductive carbon black, carbon fibers and carbon nanotubes. These carbonaceous materials can be used individually or in combination. As a conductive carbon black which can be used in the present invention, there can be mentioned the conductive carbon black described in WO01/081473. Examples of commercially available conductive carbon blacks include Ketjen Black EC and Ketjen Black EC600JD (each manufactured and sold by Ketjen Black International Company, Japan). As an example of carbon fibers which can be used in the present invention, there can be mentioned very fine carbon fibers described in WO94/023433. Carbon nanotubes, in a broad sense, are included in carbon fibers; however, in general, a carbonaceous material having a specific tubular structure is referred to as a "carbon nanotube". In the present invention, the term "carbon nanotube" means carbonaceous fibers and the like having a hollow structure, a small amount of branches and a fiber diameter of less than 75 nm, as described in U.S. Pat. Nos. 4,663,230, 5,165,909, 5,171,560, 5,578,543, 5,589,152, 5,650,370 and 6,235,674. Further, carbon nanotubes may be in the form of a coil having a coil pitch of 1 μm or less. In the present invention, the carbon nanotubes may have either a single layer structure or a multilayer structure. Further, the carbon nanotubes also include those which have a relatively large amount of branches, a hollow structure and a fiber diameter of 75 nm or more. As an example of commercially available carbon nanotubes, there can be mentioned BN FIBRIL (manufactured and sold by Hyperion Catalysis International, U.S.A).

In the shaped resin article of the present invention, it is preferred that the amount of carbonaceous material (D) is from 0.5 to 2.5% by weight, more advantageously from 1.0 to 2.0% by weight, based on the weight of the shaped resin article.

As a preferred method for incorporating carbonaceous material (D) into the shaped resin article of the present invention, there can be mentioned a method in which at least a portion of carbonaceous material (D) is dispersed in at least a portion of at least one member selected from the group consisting of polyamide (A), polyphenylene ether (B) and partially hydrogenated block copolymer (C) to obtain a masterbatch, and the thus obtained masterbatch (having carbonaceous material (D) dispersed therein) is used in the production of the shaped resin article. More preferred is a method in which at least a portion of carbonaceous material (D) is dispersed in at least a portion of polyamide (A) to obtain a masterbatch, and the thus obtained masterbatch is used in the production of the shaped resin article. With respect to the method for producing the above-mentioned masterbatch, there is no particular limitation; however, most preferred is a method in which the masterbatch is produced by melt-kneading using an extruder. Specifically, there can be mentioned a method which uses a co-rotating twin-screw extruder having at least one first inlet and at least one second inlet which are, respectively, provided at an upstream portion(s) and a downstream portion(s) of the extruder, wherein the inside of the extruder is preheated to 250 to 300° C., and wherein a resin component(s), such as polyamide (A), is fed to the extruder from the first inlet(s), thereby melt-kneading the resin(s) at an upstream portion of the extruder, while feeding carbonaceous material (D) to the extruder from the second inlet(s), thereby melt-kneading the resin(s) and carbonaceous material (D) at a downstream portion of the extruder. In this method, it is preferred that the resin temperature is less than 340° C. The amount of carbonaceous material (D) contained in the masterbatch is preferably from 5 to 30% by weight, more preferably from 8 to 25% by weight, based on the weight of the masterbatch.

With respect to the form of the above-mentioned masterbatch containing at least a portion of carbonaceous material (D), there is no particular limitation, and the masterbatch may be in any form, such as a powder, pellets, a sheet, a strand, or a mass having an indefinite shape; however, it is preferred that carbonaceous material (D) is in the form of pellets.

As the above-mentioned masterbatch, there can be used a commercially available masterbatch. As an example of commercially available masterbatches, there can be mentioned a polyamide 66/carbon fiber masterbatch which is manufactured and sold by Hyperion Catalysis International, U.S.A (trade name: Polyamide66 with Fibril™ Nanotubes RMB4620-00; carbon fiber content: 20% by weight).

The shaped resin article of the present invention may further contain wollastonite particles (E). As wollastonite particles (E), it is preferred to use wollastonite particles having an average particle diameter of from 2 to 9 μm and an aspect ratio of 5 or more. (Herein, the term "average particle diameter" means an equivalent spherical diameter which is measured and calculated by Sedigraph particle diameter analyzer (model 5100; manufactured and sold by Micromeritics Instrument Corporation, U.S.A) with respect to a solution obtained by adding 0.75 g of wollastonite particles to 45 ml of a 0.05% Calgon solution and satisfactorily dispersing the wollastonite particles therein by an ultrasonic washer; and the term "aspect ratio" means an aspect ratio which is calculated from the average diameter and average length as measured with respect to at least 5,000 wollastonite particles on a photomicrograph taken by an electron scanning microscope.)

As wollastonite particles, it is more preferred to use a mixture of two or more types of wollastonite particles having different aspect ratios. Specifically, there can be used a mixture of wollastonite particles having an aspect ratio of 5 or more and wollastonite particles having an aspect ratio of less than 5.

With respect to such a mixture of wollastonite particles having different aspect ratios, it is most preferred that the amount of wollastonite particles having an aspect ratio of 5 or more is 50% by weight or more, based on the total weight of wollastonite particles contained in the mixture (i.e., total weight of wollastonite particles (E)).

As examples of preferred methods for incorporating wollastonite particles (E) into the shaped resin article of the present invention, there can be mentioned a method in which wollastonite particles (E) together with polyphenylene ether (B) are added to other materials for producing a shaped resin article, and the resultant mixture is melt-kneaded to thereby obtain a shaped resin article; a method in which wollastonite particles (E) together with polyamide (A) are added to other materials for producing a shaped resin article, and the resultant mixture is melt-kneaded to thereby obtain a shaped resin article; and a method in which polyphenylene ether (B) and polyamide (A) are melt-kneaded together, followed by addition of wollastonite particles (E) thereto, and the resultant mixture is further melt-kneaded to thereby obtain a shaped resin article. Among the above-mentioned three methods, the third method is most preferred.

Further, from the viewpoint of improving the dispersibility and handling property of wollastonite particles (E), wollastonite particles (E) may be added in the form of a wollastonite-containing masterbatch which is obtained by dispersing wollastonite particles in at least a portion of polyamide (A) and/or at least a portion of hydrogenated block copolymer (C).

As examples of specific methods for producing the above-mentioned wollastonite-containing masterbatch, there can be mentioned the following methods (1) to (3): (1) a method in which, in the production of polyamide (A), a raw material monomer(s) for producing polyamide (A) is polymerized in the presence of wollastonite to thereby obtain a wollastonite-containing masterbatch; (2) a method which uses an extruder, wherein polyamide (A) and/or partially hydrogenated block copolymer (C) are/is dry-blended with wollastonite, and the resultant mixture is melt-kneaded at a temperature within a range such that polyamide (A) and/or partially hydrogenated block copolymer (C) are/is melted satisfactorily and heat decomposition of the polymer(s) does not occur; and (3) a method which uses a twin-screw extruder having a first inlet provided at an upstream portion and a second inlet provided at a downstream portion of the extruder, wherein polyamide (A) and/or partially hydrogenated block copolymer (C) are/is fed to the extruder from the first inlet, while feeding wollastonite to the extruder from the second inlet. Among these methods, method (3) is most preferred.

Further, in the present invention, a compatibility agent may be incorporated into the shaped resin article during the production thereof.

With respect to compatibility agents which can be used in the present invention, there is no particular limitation so long as it is an agent which can improve the physical properties of a polyamide-polyphenylene ether alloy. Specifically, the compatibility agent which can be used in the present invention is a multi-functional compound which interacts with one or both of the polyphenylene ether and the polyamide. The interaction may be either a chemical interaction (e.g., grafting) or physical interaction (e.g., change in surface properties of the dispersed phase).

Examples of compatibility agents which can be used in the production of the shaped resin article of the present invention include those which are described in detail in Unexamined Japanese Patent Laid-Open Specification Nos. Hei 8-48869 (corresponding to EP 685,527) and Hei 9-124926 (corresponding to EP 747,439). All of the conventional compatibility agents described in these patent documents can be used in the present invention, and the compatibility agents can be used individually or in combination.

Among various conventional compatibility agents, especially preferred are maleic anhydride and derivatives thereof, maleic acid and derivatives thereof, citric acid and derivatives thereof, fumaric acid and derivatives thereof, and polyphenylene ether pellets which have been modified with any of these compounds.

The amount of the compatibility agent used in the present invention is preferably from 0.01 to 25 parts by weight, relative to 100 parts by weight of the total of polyamide (A) and polyphenylene ether (B).

With respect to the form of compatibility agents which can be used in the present invention, there is no particular limitation. However, from the viewpoint of ease in handling, it is preferred to use compatibility agents in the form of relatively large particles rather than in the form of a powder formed of fine particles. Specifically, for example, when a compatibility agent having a pungent odor (e.g., maleic anhydride) is used, it is preferred that the compatibility agent is in the form of relatively large particles because the pungent odor thereof is reduced as compared to the case where the compatibility agent is in the form of a powder formed of fine particles, so that the working environment is not spoiled.

With respect to compatibility agents in the form of relatively large particles, the particle diameter thereof is preferably 1 mm or more, more preferably in the range of from 1 mm to 10 mm, most preferably from 3 to 8 mm. When the particle diameter is 10 mm or less, there is no danger of occurrence of any troubles with respect to the feeding of the particles into an extruder.

In the shaped resin article of the present invention, polyamide (A) is present as a continuous phase in which polyphenylene ether (B) is dispersed to form a dispersed phase, and partially hydrogenated block copolymer (C) is present in at least one phase selected from the group consisting of the continuous phase of the polyamide (A) and the dispersed phase of the polyphenylene ether (B). When the shaped resin article has a composition such that polyamide (A) cannot form a continuous phase, the coating adhesion strength of the shaped resin article becomes disadvantageously low. With respect to the dispersion state of partially hydrogenated block copolymer (C) in the dispersed phase of polyphenylene ether (B), there is no particular limitation, and partially hydrogenated block copolymer (C) may have a microphase-separated structure as described in U.S. Pat. No. 5,109,052, or may be in the form of a mass.

In the shaped resin article of the present invention, it is required that polyamide (A) be exposed on the surface of the shaped resin article so that the surface area of polyamide (A) exposed on the overall surface of the shaped resin article is at least 80%, based on the surface area of the shaped resin article. It is preferred that the above-mentioned surface area of polyamide (A) exposed on the overall surface of the shaped resin article (hereinafter, the above-mentioned surface area of polyamide (A) is frequently referred to simply as "polyamide area ratio") is 90% or more.

When the above-mentioned polyamide area ratio is less than 80%, the coating adhesion strength of the shaped resin article becomes disadvantageously low.

The polyamide area ratio can be measured as follows.

From a shaped resin article, a flat plate having a size of about 1 cm×about 1 cm is cut out, and used as a sample for the measurement of the polyamide area ratio. (When the shaped resin article is in the form of a pellet, the pellet per se is used as the sample). The obtained sample is immersed in a 10% aqueous solution of phosphotungstic acid at a temperature of from 20 to 80° C. for not more than 24 hours, to thereby dye the sample selectively at the polyamide portions thereof.

After dying of the sample, the dyed sample is recovered from the aqueous solution, followed by washing with water and drying. A photomicrograph (backscattered electron image) (magnification: ×2,500) of the surface of the dyed sample is taken using a field-emission scanning electron microscope (FE-SEM) (model "S-4700"; manufactured and sold by Hitachi, Ltd., Japan), wherein the microscope is operated at an acceleration voltage of 5 kV and the photomicrograph is taken at an angle perpendicular to the surface portion of the sample where the portion is observed under the microscope.

In the obtained image, the polyamide portions dyed with tungsten assume a white color due to the electron reflection of tungsten, and the undyed portions assume a black color. Thus, in the obtained image, the portions attributed to the polyamide exposed on the surface of the shaped resin article can be distinguished from other portions.

With respect to the thus obtained photomicrograph (backscattered electron image), the total area of white portions thereof is measured using an image analysis device (model name: Image-Pro PLUS ver. 4.0; Media Cybernetics, Inc., U.S.A.), and the ratio of the total area of the white portions to the overall area of the photomicrograph of the sample is obtained as the polyamide area ratio. (In the measurement of the total area of the white portions in the backscattered electron image, the threshold for monochromization of the image is determined as follows. From the histogram of the color tone of the backscattered electron image, an intensity of a peak attributed to the color of white and an intensity of a peak attributed to the color of black are determined, and the mean value of the two intensities is used as the threshold for monochromization.)

The polyamide area ratio is determined by observing at least 10 different portions of the surface of shaped resin article, and the average value of respective polyamide area ratios of the observed portions is defined as the polyamide area ratio of the shaped resin article. The above-mentioned at least 10 portions to be observed are selected from portions near the center of the shaped resin article, but not from any surface portion (such as a surface portion or thereabout, which surface portion corresponds to a point in the mold at which a flow of a molten resin in a mold stops (such a surface portion is, hereafter, referred to as a "flow-end portion")) which is expected to have a small amount of the polyamide as compared to other portions. Specifically, for example, in the case where the shaped resin article is produced by injection molding, the above-mentioned portions to be observed for the measurement of the polyamide area ratio are selected as follows. When a portion of the shaped resin article corresponding to the gate of a mold (such a portion is, hereinafter, referred to as a "gate portion") is defined as a starting point, and the distance from the gate portion to the flow-end portion is defined as 1, the polyamide area ratio is measured with respect to portions within a distance of from 0 to 0.8 as measured from the starting point.

Further, when the shaped resin article is in the form of strand cut pellets (i.e., pellets obtained by a method in which a strand which has been extruded from an extruder is cooled in a water bath, followed by cutting), cross-sections obtained by cutting the strand are not regarded as parts of the surface of the shaped resin article at which the polyamide area ratio is measured. That is, in the case of a strand cut pellet, the polyamide area ratio is measured with respect to surface portions of the pellet other than surface portions which are cross-sections obtained by cutting the strand.

In the present invention, it is required that the polyamide area ratio measured with respect to the overall surface of the shaped resin article be high for achieving excellent coating adhesion strength of the shaped resin article. When such a requirement is satisfied, the coating adhesion strength of the shaped resin article is greatly improved as compared to the coating adhesion strength of a shaped article formed from a polyamide alone or a polyphenylene alone.

The shaped resin article of the present invention is characterized in that a resin (hereinafter, referred to as a "dispersed phase resin") which forms the dispersed phase (i.e., polyphenylene ether (B) and optionally partially hydrogenated copolymer (C)) is present in a manner such that the dispersed phase resin forms moderate concavo-convex portions on the surface of the shaped resin article, and such concavo-convex portions are coated with polyamide (A). By virtue of this characteristic, the shaped resin article exhibits excellent effects as mentioned above. For forming the moderate concavo-convex portions by the dispersed phase resin, it is necessary to increase the melt viscosity of the dispersed phase resin. On the other hand, for forming a desired coating of polyamide (A) on the concavo-convex portions, it is preferred that the melt viscosity of polyamide (A) is low.

For sufficiently increasing the melt viscosity of the dispersed phase resin so as to form moderate concavo-convex portions on the surface of the shaped resin article, it is necessary that the molecular weight of partially hydrogenated block copolymer (C) be high. Specifically, by using the above-mentioned partially hydrogenated block copolymer (C-1) which has a number average molecular weight of from 200,000 to 300,000, it becomes possible to form moderate concavo-convex portions on the surface of the shaped resin article.

When a polyamide having a low melt viscosity is used alone as polyamide (A), it becomes possible to obtain a high polyamide area ratio; however, a disadvantage is that the mechanical properties (e.g., impact strength) of the shaped resin article are lowered. On the other hand, when a polyamide having a high melt viscosity is used alone as polyamide (A), the mechanical properties of the shaped resin article are improved; however, a disadvantage is that the polyamide area ratio as measured with respect to the surface of the shaped resin article is lowered, so that the coating adhesion strength is lowered. Therefore, for achieving both of excellent mechanical properties and excellent coating adhesion strength, it is necessary to use a mixture of two or more type of polyamides as mentioned above.

In the present invention, it is preferred that the melt viscosity (as measured at 290° C. and a shear rate of 1,000 sec$^{-1}$) of the dispersed phase resin (i.e., polyphenylene ether (B) and optionally partially hydrogenated block copolymer (C)) is 800 Pa·s or more, more advantageously 1,000 Pa·s or more.

On the other hand, it is preferred that the melt viscosity (as measured at 290° C. and a shear rate of 1,000 sec$^{-1}$) of the resin forming the continuous phase (i.e., polyamide (A)) (hereinafter, referred to as a "continuous phase resin") is less than 200 Pa·s, more advantageously less than 100 Pa·s.

Further, it is preferred that the ratio of the melt viscosity of the dispersed phase resin to the melt viscosity of the continuous phase resin is 10 or more, more advantageously 20 or more.

The melt viscosities of the dispersed phase resin and the continuous phase resin can be measured as follows. For example, the melt viscosity of the dispersed phase resin can be measured by a method in which a material having the same composition as that of the dispersed phase resin is subjected to extrusion molding to obtain pellets, and the melt viscosity of the obtained pellets is measured by a capillary rheometer or the like. The melt viscosity of the continuous phase resin can be measured by the same method as mentioned above. In the measurement of melt viscosity of each of the dispersed phase resin and the continuous phase resin, even when an additive (such as wollastonite) is intended to be incorporated into the resin used in the shaped resin article, the measurement of melt viscosity of the resin is conducted without incorporating the additive into the resin.

By adjusting the melt viscosity of the dispersed phase resin, the melt viscosity of the continuous phase resin and the dispersed phase resin/continuous phase resin melt viscosity ratio to 800 Pa·s or more, less than 200 Pa·s and 10 or more, respectively, it becomes easy to improve the above-mentioned polyamide area ratio, and to maintain a high coating adhesion strength (which is one of the characteristics of the shaped resin article of the present invention).

In the present invention, it is preferred that the weight ratio of the dispersed phase resin to the continuous phase resin is less than 1.0, more advantageously 0.9 or less. When the weight ratio of the dispersed phase resin to the continuous phase resin is controlled to less than 1.0, it becomes possible to improve stably the above-mentioned polyamide area ratio. Further, when partially hydrogenated block copolymer (C) is present in the dispersed phase of polyphenylene ether (B), it is preferred that the amount of polyphenylene ether (B) in the dispersed phase is from 50 to 90% by weight, based on the total weight of the dispersed phase. When the amount of polyphenylene ether in the dispersed phase is large, it becomes possible to lower the luster of the shaped resin article. Specifically, it is preferred that the amounts of polyamide (A), polyphenylene ether (B) and partially hydrogenated block copolymer (C) are 50 to 70% by weight, 25 to 45% by weight and 5 to 25% by weight, respectively, based on the total weight of polyamide (A), polyphenylene ether (B) and partially hydrogenated block copolymer (C). It is more preferred that the amounts of polyamide (A), polyphenylene ether (B) and partially hydrogenated block copolymer (C) are 50 to 60% by weight, 35 to 45% by weight and 5 to 15% by weight, respectively, based on the total weight of polyamide (A), polyphenylene ether (B) and partially hydrogenated block copolymer (C).

The shaped resin article of the present invention is characterized in that the polyamide area ratio is at least 80% even when the polyamide content of the shaped resin article is less than 80% by weight. (This means that the ratio of the polyamide exposed on the overall surface of the shaped resin article is not necessarily the same as the ratio of the polyamide present in the shaped resin article as a whole.) By virtue of this characteristic, it becomes possible to achieve a high coating adhesion strength. Examples of methods for adjusting the polyamide area ratio to at least 80% include a method in which the melt viscosity of the continuous phase resin is suppressed to a level lower than that of the dispersed phase resin; and a method in which the amount of a reaction product (graft polymer) of polyamide (A) with polyphenylene ether (B) is adjusted to an appropriate level.

Specific examples of methods for suppressing the melt viscosity of the continuous phase resin to a level lower than that of dispersed phase resin include the above-mentioned method in which the viscosity of polyamide (A) is adjusted; a method in which the polymerization degree of polyphenylene ether is adjusted so as to adjust the molecular weight of the polyphenylene ether (used in the shaped resin article) to fall within the above-mentioned range; and a method in which two or more polyphenylene ethers having different molecular weights are blended.

Specific examples of methods for adjusting the amount of a reaction product (graft polymer) of polyamide (A) with polyphenylene ether (B) to an appropriate level include a method in which the above-mentioned polyamide having the specific amino group content is used; and a method in which the modification degree of the polyphenylene ether is adjusted (e.g., by mixing a modified polyphenylene ether with an unmodified polyphenylene ether).

In the present invention, the method for adjusting the polyamide area ratio to at least 80% is not limited to those exemplified above. Further, a plurality of different methods may be used in combination for adjusting the polyamide area ratio.

With respect to the shaped resin article of the present invention, when wollastonite is used, it is preferred that the amount of wollastonite is such that the average coefficient of linear expansion of the shaped resin article is in the range of from $4.5 \times 10^{-5}$ °C.$^{-1}$ to $6.5 \times 10^{-5}$ °C.$^{-1}$, wherein the average coefficient of linear expansion of the shaped resin article is measured as follows. A type D2 flat plate having a thickness of 2 mm (prescribed in ISO294-3:1996) is prepared under conditions prescribed in ISO15103-2:1997 (melting temperature: 290° C., mold temperature: 90° C.). Then, from the center of the type D2 flat plate is cut out a segment thereof having a size of 10 mm (length as measured in the direction of flow of a resin in a mold)×3 mm (width as measured in the direction perpendicular to the direction of flow of a resin in a mold)×2 mm (thickness), and the resultant flat plate is allowed to stand at 100° C. for at least 48 hours, to thereby obtain a test specimen. Using the obtained test specimen, the coefficient of linear expansion is measured in accordance with JIS K7197-1991 at a temperature of from −30 to 80° C. at a temperature elevation rate of 5° C./min.

Specifically, the amount of wollastonite is preferably from 10 to 50 parts by weight, more preferably 15 to 35 parts by weight, relative to 100 parts by weight of the total of polyamide (A), polyphenylene ether (B) and partially hydrogenated block copolymer (C).

In the present invention, in addition to the above-mentioned components of the shaped resin article, if desired, an additional component(s) can be incorporated into the shaped resin article so long as the additional component(s) does not adversely affect the excellent properties of the shaped resin article of the present invention.

Examples of additional components include thermoplastic resins other than mentioned above, such as a polyester and a polyolefin; inorganic fillers (such as talc, kaolin, xonotlite, titanium oxide, potassium titanate, a carbon fiber and a glass fiber); conventional silane coupling agents which enhance the affinity between an inorganic filler and a resin; flame retardants (such as a halogenated resin, a silicone flame retardant, magnesium hydroxide, aluminum hydroxide, an organic phosphoric ester compound, ammonium polyphosphate and red phosphorus), fluororesins having an effect to prevent the dripping of flaming particles; plasticizers (such as an oil, a low molecular weight polyolefin, a polyethylene glycol and a fatty ester); auxiliary flame retardants, such as antimony trioxide; carbon black as a pigment; conductivity-imparting agents, such as a carbon fiber and a conductive carbon black; antistatic agents; various peroxides; antioxidants; ultraviolet absorbers; and light stabilizers.

In the present invention, the amount of the additional component(s) incorporated into the shaped resin article is not more than 100 parts by weight, relative to 100 parts by weight of the total weight of polyamide (A), polyphenylene ether (B), partially hydrogenated block copolymer (C) and the compatibility agent.

Next, explanation is given below with respect to the method for producing a resin composition which can be used for producing the shaped resin article of the present invention.

As specific examples of processing apparatuses which can be used to prepare the above-mentioned resin composition of the present invention, there can be mentioned a single-screw extruder, a twin-screw extruder, a roll, a kneader, a Brabender Plastograph and a Banbury mixer. Among these apparatuses, preferred is a twin-screw extruder, and especially preferred is a twin-screw extruder provided with a first inlet and at least one second inlet which are, respectively, formed at an upstream portion and a downstream portion of the extruder.

It is especially preferred to use an extruder having a screw diameter of 50 mm and equipped with 3 or more feeders, wherein a polyamide, a polyphenylene ether and a compatibility agent are fed to the extruder by different feeders, respectively, thereby melt-kneading together the polyamide, the polyphenylene ether and the compatibility agent.

Especially when the compatibility agent used is in the form of relatively large particles, and the polyphenylene ether used is in the form of a powder formed of fine particles, the use of different feeders for the feeding of the compatibility agent and the feeding of the polyphenylene ether is advantageous in that it becomes possible to prevent the classification of the particle mixture (i.e., mixture of relatively large particles of the compatibility agent and fine particles of the polyphenylene ether) in an extruder, which classification leads to a disadvantage in that the ratio of the compatibility agent to the polyphenylene ether varies depending on a position in a feeder used for feeding both of the compatibility agent and the polyphenylene ether. When such a disadvantage is caused, the ratio of the polyphenylene ether to the compatibility agent, which are fed to the extruder, fluctuates during the operation of the extruder, thereby causing the fluctuation of the viscosity and particle diameter of the dispersed phase resin. Such a fluctuation of the viscosity and particle diameter of the dispersed phase resin is likely to cause a problem in that the luster and coating adhesion strength of the final shaped resin article varies depending on a position in the shaped resin article.

Further, as a feeder for the compatibility agent, it is especially preferred to use a screw-type gravimetric feeder. By using a screw-type gravimetric feeder, the stability of the feeding of the compatibility agent is improved, thereby suppressing the fluctuation of the quality of the final shaped resin article.

With respect to the melt-kneading temperature used for producing the resin composition, there is no particular limitation. In general, an appropriate temperature for obtaining a desired resin composition is selected from the range of from 240 to 360° C. The resin temperature during the melt-kneading is preferably from 310 to 340° C.

Specific examples of the method for producing the above-mentioned resin composition are described below. However, needless to say, the method for producing the above-mentioned resin composition should not be limited to these examples.

As an apparatus used for producing the resin composition, there can be mentioned a twin-screw extruder having a first inlet and at least one second inlet which are provided, respectively, at upstream and downstream portions of the extruder, wherein the first inlet is provided with a screw-type gravimetric feeder and a belt-type gravimetric feeder, and the second inlet is provided with another screw-type gravimetric feeder. Using such a twin screw extruder, the production of the resin composition can be performed by any of the following methods (1) to (3): (1) a method in which a mixture of a block copolymer and a polyphenylene ether is fed to the extruder from the first inlet by the belt-type gravimetric feeder, and a compatibility agent is fed to the extruder through the first inlet by the screw-type gravimetric feeder, thereby melt-kneading together the above-mentioned mixture and the compatibility agent at the upstream portion of the extruder, while feeding a polyamide to the extruder from the second inlet, thereby melt-kneading the resultant mixture at the downstream portion of the extruder; (2) a method in which a polyphenylene ether is fed to the extruder from the first inlet by the belt-type gravimetric feeder, and a mixture of a compatibility agent and a block copolymer is fed to the extruder from the first inlet by the screw-type gravimetric feeder, thereby melt-kneading together the polyphenylene ether and the above-mentioned mixture, while feeding a polyamide to the extruder from the second inlet, thereby melt-kneading the resultant mixture at the downstream portion of the extruder; and (3) a method in which a mixture of a polyphenylene ether in the form of a powder and a block copolymer is fed to the extruder from the first inlet by the belt-type gravimetric feeder, and a compatibility agent and a polyphenylene ether in the form of pellets are fed to the extruder from the first inlet by the screw-type gravimetric feeder, thereby melt-kneading together the polyphenylene ether, the block copolymer and the compatibility agent, while feeding a polyamide to the extruder from the second inlet, thereby melt-kneading the resultant mixture at the downstream portion of the extruder.

The thus produced resin composition is subjected to molding by a desired method, thereby obtaining the shaped resin article of the present invention. The shaped resin article includes not only injection-molded articles, but also extrusion-molded articles, such as sheets, films and pellets, and secondary processed molded articles which are obtained by subjecting the above-mentioned extrusion-molded articles to injection molding or the like. Preferred examples of the forms of the shaped resin article include cylindrical pellets, each having a diameter of less than 3 mm and a length of less than 3 mm; spherical pellets, each having a diameter of less than 3 mm; disc-shaped pellets, each having a diameter of less than 4 mm; and an injection-molded article obtained by subjecting any one of the above-mentioned pellets to injection molding.

In another aspect of the present invention, there is provided a conductive resin composition comprising:
- a polyamide (A),
- a polyphenylene ether (B),
- a block copolymer (C) comprising at least one aromatic vinyl polymer block comprised mainly of aromatic vinyl monomer units, and at least one conjugated diene polymer block comprised mainly of conjugated diene monomer units,
- a conductive carbonaceous material (D), and
- wollastonite particles (E).

With respect to polyamide (A) used in the conductive resin composition of the present invention, any of the polyamides which are described above in connection with the shaped resin article of the present invention can be used. However, in the conductive resin composition of the present invention, it is not necessary to use two or more different types of polyamides, and only one type of polyamide may be used as polyamide (A). Nevertheless, it is preferred to use two or more different types of polyamides as in the case of the shaped resin article of the present invention.

With respect to polyphenylene ether (B) used in the conductive resin composition of the present invention, any of the polyphenylene ethers which are described above in connection with the shaped resin article of the present invention can be used.

Further, with respect to block copolymer (C) used in the conductive resin composition of the present invention, any of the block copolymers which are described above in connection with the shaped resin article of the present invention can be used. However, block copolymer (C) used in the conductive resin composition of the present invention does not need to be hydrogenated.

It is preferred that block copolymer (C) used in the conductive resin composition of the present invention has a number average molecular weight in the range of from 50,000 to less than 150,000.

Furthermore, with respect to conductive carbonaceous material (D) and wollastonite particles (E), any of the conductive carbonaceous materials and wollastonite particles which are described above in connection with the shaped resin article of the present invention can be used.

With respect to the method for producing the conductive resin composition of the present invention, any of the methods which are described above in connection with the resin composition that can be used for producing the shaped resin article of the present invention can be used.

Examples of various molded articles which can be produced from the shaped resin article and conductive resin composition of the present invention include electric equipment for motorcycles and automobiles, such as a relay box material; parts for electric or electronic appliances, such as an IC tray, a chassis and cabinet of various disc players; parts for office automation machines and mechanical parts, such as various computers and peripheral equipment therefor; parts for motorcycles, such as a cowl; exterior parts for automobiles, such as a bumper, a fender, a door panel, various moles and emblems for an automobile, an outer door handle, a door mirror housing, a wheel cap, a roof rail and a staying material therefor, and a spoiler; and interior parts for automobiles, such as an instrument panel, a console box and a trim.

Among the above-exemplified molded articles, the shaped resin article and conductive resin composition of the present invention are suitable for producing exterior parts for automobiles.

BEST MODE FOR CARRYING OUT THE INVENTION

Hereinbelow, the present invention will be described in more detail with reference to the following Production Examples, Examples and Comparative Examples, which should not be construed as limiting the scope of the present invention.

Production Example 1

Production of Polyphenylene Ether Modified with Maleic Anhydride (Hereinafter, Referred to as "MPPE")

MPPE was prepared as follows. 3 Parts by weight of maleic anhydride and 100 parts by weight of polyphenylene ether having a reduced viscosity of 0.42 dl/g were dry blended, followed by melt-kneading and subsequent pelletization in an extruder "ZSK-40" (manufactured and sold by Coperion Werner & Pfleiderer GmbH & Co. KG, Germany; L/D (the ratio of the length (L) of the screw of the extruder to the diameter (D) of the screw of the extruder)=42) at a cylinder temperature of 320° C., thereby obtaining MPPE in the form of pellets.

Production Example 2

Production of a Copolymer of Polyamide 6,6 and Polyamide 6,I (Hereinafter, Abbreviated to "PA66/6I")

Into an autoclave having a volume of 50 liters were charged 20.0 kg of an equimolar salt of adipic acid and hexamethylenediamine, 5.0 kg of an equimolar salt of isophthalic acid and hexamethylenediamine, 1.0 kg of adipic acid and 25 kg of purified water. The contents of the autoclave were well stirred, and the atmosphere inside the autoclave was fully purged with nitrogen. Subsequently, the temperature of the autoclave was elevated from room temperature to 220° C. over about 1 hour while stirring.

During the elevation of the temperature of the autoclave, the internal pressure increased due to the natural pressure increase caused by the steam inside the autoclave; however, the heating of the autoclave was performed while removing the water from the reaction system in the autoclave so as to prevent the internal pressure of the autoclave from exceeding 18 kg/cm$^2$-G. After the temperature of the autoclave reached 220° C., the heating of the autoclave was continued for two hours to elevate the temperature to 260° C., whereupon the heating was stopped. Subsequently, the discharge bulb of the autoclave was closed, and the autoclave was allowed to cool to room temperature over about eight hours. Then, the autoclave was opened, and 20 kg of a polymer was taken out from the autoclave. The polymer was pulverized, thereby obtaining a pulverized polymer.

The thus obtained pulverized polymer was subjected to a solid phase polymerization at 200° C. for 10 hours under a flow of nitrogen gas, to obtain a polyamide.

The thus obtained polyamide had a hexamethylene isophthalamide monomer unit content of about 19 mol %, a terminal amino group content of $3.9 \times 10^{-5}$ mol/g and a terminal carboxyl group content of $10.2 \times 10^{-5}$ mol/g.

Production Example 3

Production of a Polyamide/Carbon Masterbatch (Hereinafter, Referred to as "PA-MB")

PA-MB was produced using a twin-screw extruder (ZSK-58MC, manufactured and sold by Coperion Werner & Pfleiderer GmbH & Co. KG, Germany) which had one inlet at an upstream portion thereof (hereinafter, referred to as "upstream inlet") and another inlet at a downstream portion thereof (hereinafter, referred to as "downstream inlet"), wherein L/D (the ratio of the length (L) of the screw of the extruder to the diameter (D) of the screw of the extruder) was 46. Specifically, into the twin-screw extruder were introduced 90 parts by weight of PA66-1 and 10 parts by weight of KB (i.e., ketjen black) through the upstream inlet of the extruder and the downstream inlet of the extruder, respectively. The contents of the extruder were melt-kneaded under conditions wherein the cylinder temperatures were 280° C. at a portion between the upstream inlet and the downstream inlet of the extruder, and 300° C. at a portion between the downstream inlet and the dye, the screw revolution rate was 400 rpm and the discharge rate was 300 kg/h, to thereby produce PA-MB.

Example 1

Pellets of a resin composition were produced using a co-rotating intermeshing twin-screw extruder "ZSK-70MC" (manufactured and sold by Coperion Werner & Pfleiderer GmbH & Co. KG, Germany; L/D=46) which has twelve cylinder units (which are, respectively, referred to as "1st cylinder unit", "2nd cylinder unit" ... "12th cylinder unit" as viewed in an extrusion direction of the extruder) and a dye, wherein the respective temperatures of the cylinder units can be separately adjusted. The extruder has an inlet at the 1st cylinder unit (hereinafter, referred to as "upstream inlet"), another inlet at the 6th cylinder unit (hereinafter, referred to as "1st downstream inlet"), still another inlet at the 8th cylinder unit (hereinafter, referred to as "2nd downstream inlet"), and two vent ports (through which vacuum sucking can be performed) at the 5th and 11th cylinder units. A belt type gravimetric feeder and two screw type gravimetric feeders are provided at the upstream inlet of the extruder, and another screw type gravimetric feeder is provided at the 1st downstream inlet of the extruder.

Specifically, using the above-mentioned extruder, the production of pellets of a resin composition was performed as follows. First, raw materials for the resin composition were fed to the above-mentioned extruder as follows. A polyphenylene ether powder (hereinafter, referred to as "PPE1") having a reduced viscosity of 0.52 dl/g (as measured with respect to a chloroform solution thereof having a polyphenylene ether concentration of 0.5 g/dl at 30° C.) was fed to the extruder through one of the screw type gravimetric feeders (hereinafter, referred to as "feeder 1") provided at the upstream inlet of the extruder. Maleic anhydride (in the form of tablets each having a diameter of 4 to 5 mm) (manufactured and sold by Mitsubishi Chemical Corporation, Japan) (hereinafter, abbreviated to "MAH") as a compatibilizer was fed to the extruder through the other screw type gravimetric feeder (hereinafter, referred to as "feeder 2") provided at the upstream inlet of the extruder. 4 Parts by weight of a polystyrene/polyethylene butylene/polystyrene block copolymer (styrene content: 33%) (hereinafter, referred to as "SEBS1") having a number average molecular weight (Mn) of 246,000 and 8 parts by weight of a polystyrene/polyethylene butylene/polystyrene block copolymer (styrene content: 29%) (hereinafter, referred to as "SEBS2") having a number average molecular weight (Mn) of 98,500 were dry blended using a Henschel mixer. The resultant mixture was fed to the extruder through the belt type gravimetric feeder (hereinafter, referred to as "feeder 3") provided at the upstream inlet of the extruder. By using a tumbler, a polyamide blend was prepared by dry blending 40 parts by weight of polyamide 6,6 (hereinafter, referred to as "PA66-a") having a viscosity number of 120 ml/g, a terminal amino group content of $2.5 \times 10^{-5}$ mol/g and a terminal carboxyl group content of $11.6 \times 10^{-5}$ mol/g, with 10 parts by weight of polyamide 6,6 (hereinafter, referred to as "PA66-b") having a viscosity number of 130 ml/g, a terminal amino group content of $4.2 \times 10^{-5}$ mol/g and a terminal carboxyl group content of $9.1 \times 10^{-5}$ mol/g. The obtained polyamide blend was fed to the extruder through the screw type gravimetric feeder (hereinafter, referred to as "feeder 4") provided at the 1st down-stream inlet of the extruder.

The temperature conditions in the extruder were as follows: the 1st cylinder unit was cooled with water, each of the 2nd and 3rd cylinder units had a temperature of 250° C., each of the 4th to 7th cylinder units had a temperature of 320° C., each of the 8th to 12th cylinder units had a temperature of 280° C., and the dye of the extruder had a temperature of 320° C.

The above-mentioned raw materials were melt kneaded together and pelletized using the above-mentioned extruder while adjusting the feeding rates of the raw materials such that the raw material mixture in the extruder had a composition as indicated in Table 1 and the discharge rate of the resultant resin composition was 909 kg/h, to thereby obtain pellets of the resin composition.

During the above-mentioned melt-kneading, the screw revolution rate was 500 rpm.

(Measurement of the Molecular Weight of Polyphenylene Ether)

About 10 g of the above-obtained pellets were sliced using a microtome, to obtain slices of pellets each having a thickness of about 20 µm. The obtained slices were extracted with 50 ml of chloroform by using a Soxhlet's extractor, thereby obtaining a solution of sliced pellets in chloroform. The obtained solution of sliced pellets in chloroform (in which the main solutes are the polyphenylene ether and the block copolymers) was analyzed by GPC (gel permeation chromatography) using an ultraviolet spectrometric detector, and the molecular weight of polyphenylene ether was determined using a calibration curve obtained with respect to the standard polystyrene samples. The ultraviolet spectrometric detector was operated at a UV wavelength of 283 nm so as not to detect the block copolymers which are eluted concomitantly with the polyphenylene ether during the GPC analysis.

The thus obtained data on the molecular weights were analyzed. As a result, it was found that the amount of polyphenylene ether molecules each independently having a molecular weight of 200,000 or more and polyphenylene ether molecules each independently having a molecular weight of 5,000 or less were, respectively, 1.45% by weight and 4.78% by weight, each based on the total weight of the polyphenylene ether molecules. It was also found that the weight ratio of the polyphenylene ether molecules each independently having a molecular weight of 200,000 or more to the polyphenylene ether molecules each independently having a molecular weight of 5,000 or less was 0.30.

(Determination of the Area of Polyamide Exposed on the Surface of a Pellet (Polyamide Area Ratio))

The ratio of the surface area of polyamide exposed on the surface of the above-obtained pellet to the overall surface area of the pellet (i.e., polyamide area ratio) was determined as follows. A pellet was immersed in a 10% by weight aqueous solution of phosphotungstic acid at 40° C. for 8 hours, to thereby dye the pellet selectively at the polyamide portions thereof. Then, the dyed pellet was recovered from the aqueous solution, followed by washing with water and drying. A photomicrograph (backscattered electron image) (magnification: ×2,500) of the surface of the dyed pellet was taken using a field-emission scanning electron microscope (FE-SEM) (model "S-4700"; manufactured and sold by Hitachi, Ltd., Japan), wherein the microscope was operated at an acceleration voltage of 5 kV and the photomicrograph was taken at an angle perpendicular to the surface portion of the pellet, which was observed under the microscope. With respect to the thus obtained photomicrograph (backscattered electron image), the total area of white portions thereof was measured using an image analysis device (model name: Image-Pro PLUS ver. 4.0; Media Cybernetics, Inc., U.S.A.), and the ratio of the total area of the white portions to the overall area of the photomicrograph of the pellet was obtained as the area of polyamide exposed on the surface of the pellet. The result is shown in Table 1. (In the measurement of the total area of the white portions in the backscattered electron image, the threshold for monochromization of the image was determined as follows. From the histogram of the color tone of the backscattered electron image, an intensity of a peak attributed to the color of white and an intensity of a peak attributed to the color of black were determined, and the mean value of the two intensities was used as the threshold for monochromization.)

(Matteness of the Surface of a Shaped Resin Article)

Using an injection molding machine "IS80EPN" (cylinder temperature: 280° C.; mold temperature: 80° C.), the above-obtained pellets were molded into a shaped resin article in the form of a flat plate having a width of 50 mm, a length of 90 mm and a thickness of 2.5 mm. The injection conditions were as follows: the injection velocity (in terms of an average velocity of a molten resin passing through the critical cross-sectional area as prescribed in ISO 294-1) was 200 mm/s, the injection pressure was a minimum pressure needed to charge a resin into the molding machine (i.e., minimum pressure needed to prevent a shaped resin article from suffering a sink mark or to prevent the mold from being insufficiently filled), the injection time was 20 seconds, and the cooling time was 25 seconds.

The surface of the above-obtained shaped resin article was visually observed. As a result, it was found that almost entire surface of the shaped resin article (except for a portion thereof corresponding to a gate of the mold) was matte. In the present invention, the matteness of the surface of a shaped resin article is evaluated in accordance with the following criteria.

I: The entire surface of the shaped resin article has gloss, and there is almost no matte portion in the surface of the shaped resin article.

II: The shaped resin article has a matte portion only at a surface portion thereof corresponding to a point in the mold at which a flow of a molten resin stops.

III: Almost entire surface of the shaped resin article, except for a portion thereof corresponding to a gate of the mold, is matte.

IV: Almost entire surface of the shaped resin article is matte.

For rendering easy the uniform application of a coating composition on the surface of a shaped resin article so as to form a coating having a uniform thickness, it is preferred that the area of matte portion in the surface of the shaped resin article is as large as possible.

(Evaluation of the Coating Adhesion Strength)

For evaluation of the strength of adhesion of a coating to a shaped resin article, the above-mentioned flat plate was coated by using an automated spray coating machine under conditions wherein the resultant coating had a thickness of 20 μm. As a coating composition, Z-NY (trade name; manufactured and sold by Origin Electric Co., Ltd., Japan) was used. After completion of the spray coating, the coated flat plate was baked at 80° C. for 30 minutes.

Then, the coated flat plate was allowed to stand still at 23° C. and at a humidity of 50% for 24 hours. With respect to a certain area (having a size of 2 cm×2 cm) of the coated surface of the flat plate, the coated surface was cut with a cutter to form a checkered cut pattern composed of 100 square coating sections each having a size of 2 mm×2 mm, and a peeling test was performed in which a cellophane adhesive tape was adhered to the coated surface portion having the checkered cut pattern and, then, quickly peeled off. The coating adhesion strength was evaluated by measuring the number of square coating sections which were left on the coated surface after the cellophane adhesive tape had been peeled off. As a result, it was found that 95 square coating sections (out of 100 square coating sections) were left on the surface of the flat plate.

The results are shown in Table 1.

(Sharpness of an Image Reflected in the Coated Surface)

The appearance of the above-mentioned coated flat plate was observed as follows. First, the coated surface of the coated flat plate was carefully observed to see whether or not there was any unevenness on the surface. Then, the sharpness of an image reflected in the coated surface was evaluated by observing an image of a fluorescent light (located about 1.5 m above the coated flat plate) reflected in the coated surface of the flat plate. The criteria for the evaluation are as follows.

Class A: The outline of the image of the fluorescent light reflected in the coated surface is clearly distinct.

Class B: The outline of the image of the fluorescent light reflected in the coated surface is indistinct but is recognizable.

Class C: The outline of the image of the fluorescent light reflected in the coated surface is indistinct and is barely recognizable.

Class D: There are minor unevennesses on the coated surface.

Further, for the purpose of measuring the melt viscosity of a resin component forming a dispersed phase of a shaped resin article (hereinafter, referred to as "dispersed phase resin component"), pellets formed only of the dispersed phase resin component are produced in substantially the same manner as mentioned above in connection with the production of the pellets of the resin composition, except that the feeding through the 4th feeder was not performed (i.e., only the feedings through the 1st to 3rd feeders were performed). On the other hand, for the purpose of measuring the melt viscosity of a resin component forming a continuous phase of a shaped resin article (hereinafter, referred to as "continuous phase resin component"), pellets formed only of the continuous phase resin component were produced in substantially the same manner as mentioned above in connection with the production of the pellets of the resin composition, except that the feedings through 1st to 3rd feeders were not performed (i.e., only the feeding through the 4th feeder was performed).

Using the thus obtained pellets, the melt viscosity ($\eta d$) of the dispersed phase resin component and the melt viscosity ($\eta m$) of the continuous phase resin component were measured at 290° C. and at a flow rate of 1,000 sec$^{-1}$ by using a capillary rheometer. As a result, it was found that the melt viscosity ($\eta d$) of the dispersed phase resin component was about 1,570 Pa·sec, and the melt viscosity ($\eta m$) of the continuous phase resin component was about 50 Pa·sec. The ratio (($\eta d$)/($\eta m$)) between the above-mentioned viscosity values was about 31.

Examples 2 to 4 and Comparative Example 1

The production of pellets of a resin composition was performed in substantially the same manner as in Example 1, except that the types and amounts of raw materials were changed as shown in Table 1. Table 1 also shows the various properties of the obtained pellets, which were evaluated in substantially the same manner as in Example 1.

Specifically, with respect to the raw materials used in Examples 2 to 4 and Comparative Example 1, the raw materials which are different from those used in Example 1 are as follows:

Polyphenylene ether powder (hereinafter, referred to as "PPE2") having a reduced viscosity of 0.42 dl/g;

MPPE produced in Production Example 1;

Polyamide 6,6 (hereinafter, referred to as "PA66-c") having a viscosity number of 230 ml/g, a terminal amino group content of $2.4 \times 10^{-5}$ mol/g and a terminal carboxyl group content of $4.8 \times 10^{-5}$ mol/g; and PA66/6I produced in Production Example 2.

Examples 5 to 7 and Comparative Example 2

The production of pellets of a resin composition was performed in substantially the same manner as in Example 1, except that the below-mentioned raw materials were used. With respect to the obtained pellets, various properties thereof were measured in substantially the same manner as in Example 1. The results are shown in Table 2, together with the compositions of the pellets.

Polystyrene/polyethylene butylene/polystyrene block copolymer (styrene content: 60%)(hereinafter, referred to as "SEBS3") having a number average molecular weight (Mn) of 105,000;

ketjen black "EC-600JD" (trade name; manufactured and sold by Ketjen Black International Company Ltd., Japan) (hereinafter, referred to as "KB"); and polyamide/carbon masterbatch (hereinafter, referred to as "PA-MB") produced in Production Example 3.

TABLE 1

| | | | Ex. 1 | Ex. 2 | Ex. 3 | Ex. 4 | Comp. Ex. 1 |
|---|---|---|---|---|---|---|---|
| Upstream inlet | | | | | | | |
| Feeder 1 | PPE-1 (parts by weight) | *1 | 38 | 38 | | 30 | 38 |
| | PPE-2 (parts by weight) | *2 | | | 38 | | |
| Feeder 2 | MPPE (parts by weight) | *3 | | | | 8 | |
| | MAH (parts by weight) | *4 | 0.2 | 0.3 | 0.3 | | 0.3 |
| Feeder 3 | SEBS1 (parts by weight) | *5 | 4 | 4 | 4 | 4 | 4 |
| | SEBS2 (parts by weight) | *6 | 8 | 8 | 8 | 8 | 8 |
| 1st downstream inlet | | | | | | | |
| Feeder 4 | PA66-a (parts by weight) | *7 | 40 | 40 | 40 | 40 | |
| | PA66-b (parts by weight) | *8 | 10 | | | 10 | |
| | PA66-c (parts by weight) | *9 | | | 10 | | 50 |
| | PA66/6I (parts by weight) | *10 | | 10 | | | |
| Polyamide area ratio | | % | 84 | 94 | 90 | 87 | 67 |
| PPE having a molecular weight of 5,000 or less | | % | 4.78 | — | 7.18 | 3.67 | — |
| PPE having a molecular weight of 200,000 or more | | % | 1.45 | — | 0.82 | 3.4 | — |
| PPE having a molecular weight of 200,000 or more/PPE having a molecular weight of 5,000 or less | | | 0.30 | — | 0.11 | 0.93 | — |
| Coating adhesion strength (number of square coating sections left on the surface of a shaped resin article out of 100 square coating sections) | | | 95 | 100 | 60 | 100 | 5 |
| Sharpness of an image reflected in the coated surface | | — | A | A | A | A | A |
| Matteness of the surface | | — | III | II | II | III | I |

*1 PPE powder having a reduced viscosity of 0.52 dl/g
*2 PPE powder having a reduced viscosity of 0.42 dl/g
*3 MAH-modified PPE obtained by melt kneading PPE having a reduced viscosity of 0.42 dl/g with MAH
*4 Maleic anhydride (in the form of tablets)
*5 SEBS block copolymer (styrene content: 33%; Mn: 246,000)
*6 SEBS block copolymer (styrene content: 29%; Mn: 98,500)
*7 PA6,6 viscosity number: 120 ml/g; $[NH_2] = 2.5 \times 10^{-5}$ mol/g; $[COOH] = 11.6 \times 10^{-5}$ mol/g
*8 PA6,6 viscosity number: 130 ml/g; $[NH_2] = 4.2 \times 10^{-5}$ mol/g; $[COOH] = 9.1 \times 10^{-5}$ mol/g
*9 PA6,6 viscosity number: 230 ml/g; $[NH_2] = 2.4 \times 10^{-5}$ mol/g; $[COOH] = 4.8 \times 10^{-5}$ mol/g
*10 PA6,6/6,I containing 19 mol % of polyamide 6I; $[NH_2] = 3.9 \times 10^{-5}$ mol/g; $[COOH] = 10.2 \times 10^{-5}$ mol/g

TABLE 2

|  |  |  | Ex. 5 | Comp. Ex. 2 | Ex. 6 | Ex. 7 |
|---|---|---|---|---|---|---|
| Upstream inlet | | | | | | |
| Feeder 1 | PPE-1 (parts by weight) | | 38 | 38 | 38 | 22 |
| Feeder 2 | MPPE (parts by weight) | | | | | 16 |
|  | MAH (parts by weight) | | 0.3 | 0.3 | 0.3 | |
| Feeder 3 | SEBS1 (parts by weight) | | 12 | | 12 | 3 |
|  | SEBS2 (parts by weight) | | | 12 | | 5 |
|  | SEBS3 (parts by weight) | *11 | | | | 4 |
| 1st downstream inlet | | | | | | |
| Feeder 4 | PA66-a (parts by weight) | | | | 50 | 20 |
|  | PA66-b (parts by weight) | | 30 | 30 | | 10 |
|  | PA66-c (parts by weight) | | | | | |
|  | PA-MB (parts by weight) | *12 | 20 | 20 | | 20 |
|  | KB (parts by weight) | *13 | | | 2 | |
| Polyamide area ratio | | % | 81 | 75 | 96 | 97 |
| PPE having a molecular weight of 5,000 or less | | % | — | — | — | 3.12 |
| PPE having a molecular weight of 200,000 or more | | % | — | — | — | 0.92 |
| PPE having a molecular weight of 200,000 or more/PPE having a molecular weight of 5,000 or less | | | — | — | — | 0.29 |
| Coating adhesion strength (number of square coating sections left on the surface of a shaped resin article out of 100 square coating sections) | | | 83 | 45 | 70 | 100 |
| Sharpness of an image reflected in the surface | | | — | B | A | B | A |
| Matteness of the surface | | | — | III | II | IV | IV |

*11 SEBS block copolymer (styrene content: 60%; Mn: 105,000)
*12 Conductive polyamide/carbon masterbatch (carbon content: 10 wt %)
*13 Conductive carbon (ketjen black EC600JD)

Examples 8 to 10 and Comparative Example 3

The production of pellets of a resin composition was performed in substantially the same manner as in Example 1, except that the extruder used in Examples 8 to 10 and Comparative Examples 3 further had another screw type gravimetric feeder (hereinafter, referred to as "feeder 5") provided at the 2nd downstream inlet through which wollastonite was fed to the extruder, to thereby obtain pellets. With respect to the obtained pellets, various properties thereof were measured in substantially the same manner as in Example 1. The results are shown in Table 3, together with the compositions of the pellets. Specifically, with respect to the raw materials used in Examples 8 to 10 and Comparative Example 3, the raw materials which are different from those used in Example 1 or were not used in Example 1 are as follows:

polyamide 6 "1013B" (trade name; manufactured and sold by Ube Industries, Ltd., Japan)(hereinafter, referred to as "PA6"); and the following wollastonites each manufactured and sold by Nyco minerals Inc., U.S.A.:

[wollastonite 1] (average particle diameter: 5 μm, aspect ratio: 13),

[wollastonite 2] (average particle diameter: 5 μm, aspect ratio: 3), and

[wollastonite 3] (average particle diameter: 10 μm, aspect ratio: 13) (treated with a 0.5% by weight aminosilane compound).

TABLE 3

|  |  | Ex. 8 | Ex. 9 | Comp. Ex. 3 | Ex. 10 |
|---|---|---|---|---|---|
| Upstream inlet | | | | | |
| Feeder 1 | PPE-1 (parts by weight) | 38 | 38 | 38 | 38 |
| Feeder 2 | MAH (parts by weight) | 0.3 | 0.3 | 0.3 | 0.3 |
| Feeder 3 | SEBS1 (parts by weight) | 12 | 12 | | 12 |
|  | SEBS2 (parts by weight) | | | 12 | |
| 1st downstream inlet | | | | | |
| Feeder 4 | PA66-a (parts by weight) | 30 | 30 | 30 | 30 |
|  | PA6 (parts by weight) | 20 | | | |
|  | PA66/6I (parts by weight) | | 20 | 20 | 20 |

TABLE 3-continued

|  |  |  | Ex. 8 | Ex. 9 | Comp. Ex. 3 | Ex. 10 |
|---|---|---|---|---|---|---|
| 2nd downstream inlet | | | | | | |
| Feeder 5 | Wollastonite 1 (parts by weight) | *14 | 20 | 20 | | 15 |
| | Wollastonite 2 (parts by weight) | *15 | | | | 5 |
| | Wollastonite 3 (parts by weight) | *16 | | | 20 | |
| Polyamide area ratio | | % | 87 | 83 | 82 | 88 |
| Coating adhesion strength (number of square coating sections left on the surface of a shaped resin article out of 100 square coating sections) | | | 100 | 100 | 32 | 100 |
| Sharpness of an image reflected in the coated surface | | | — | A | A | D | A |
| Matteness of the surface | | | — | III | III | I | IV |

*14 Wollastonite (average particle diameter: 5 μm, aspect ratio: 13)
*15 Wollastonite (average particle diameter 5 μm, aspect ratio: 3)
*16 Wollastonite (average particle diameter: 10 μm, aspect ratio: 13)

Example 11

The production of pellets of a resin composition was performed in substantially the same manner as in Example 1, except that the raw materials were used in a proportion as shown in Table 4. With respect to the obtained pellets, various properties thereof were measured in substantially the same manner as in Example 1. The results are also shown in Table 4, together with the compositions of the pellets.

TABLE 4

|  |  |  | Ex. 11 |
|---|---|---|---|
| Upstream inlet | | | |
| Feeder 1 | PPE-1 (parts by weight) | | 38 |
| Feeder 2 | MAH (parts by weight) | | 0.3 |
| Feeder 3 | SEBS1 (parts by weight) | | 3 |
| | SEBS2 (parts by weight) | | 5 |
| | SEBS3 (parts by weight) | | 4 |
| 1st downstream inlet | | | |
| | PA66-a (parts by weight) | | 20 |
| | PA66-b (parts by weight) | | 10 |
| | PA-MB (parts by weight) | | 20 |
| 2nd downstream inlet | | | |
| | Wollastonite 1 (parts by weight) | | 15 |
| | Wollastonite 2 (parts by weight) | | 5 |
| | Wollastonite 3 (parts by weight) | | |
| Polyamide area ratio | | % | 92 |
| Coating adhesion strength (number of square coating sections left on the surface of a shaped resin article out of 100 square coating sections) | | | 100 |
| Sharpness of an image reflected in the coated surface | | | A |
| Matteness of the coated surface | | | IV |

INDUSTRIAL APPLICABILITY

The shaped resin article of the present invention is advantageous not only in that the shaped resin article has excellent matte surface, but also in that the shaped resin article has excellent strength of adhesion to a coating formed on the shaped resin article (i.e., "coating adhesion strength"), and such a coating formed on the shaped resin article has excellent sharpness of an image reflected therein (i.e., the coating has excellent luster). Further, by the use of the conductive resin composition of the present invention, it becomes possible to produce a shaped article which is advantageous not only in that the shaped article has excellent matte surface, but also in that the shaped article has excellent coating adhesion strength, and a coating formed on the shaped article has excellent sharpness of an image reflected therein. In addition, the produced shaped article has a satisfactorily low coefficient of linear expansion, which is especially advantageous in the field of large shaped articles, such as an automobile fender and an automobile back door. The shaped resin article of the present invention and the shaped article produced from the conductive resin composition of the present invention can be advantageously used in a wide variety of fields, e.g., not only in a field of exterior parts for automobiles, but also in the fields of electric and electronic parts, parts of office automation machines, mechanical parts, and electric and interior parts of motorcycles and automobiles.

The invention claimed is:
1. A shaped resin article comprising:
a polyamide (A) comprising at least two different polyamide components,
a polyphenylene ether (B),
one or more partially hydrogenated block copolymers (C), each independently obtained by partially hydrogenating an unhydrogenated block copolymer comprising at least one aromatic vinyl polymer block comprised mainly of aromatic vinyl monomer units, and at least one conjugated diene polymer block comprised mainly of conjugated diene monomer units, said partially hydrogenated block copolymers (C) including at least one partially hydrogenated block copolymer (C-1) having a number average molecular weight of from 200,000 to 300,000, and
wollastonite particles (E) having an average particle diameter of from 2 to 9 μm,
wherein said polyamide (A) is present as a continuous phase in which said polyphenylene ether (B) is dispersed to form a dispersed phase, and said partially hydrogenated block copolymer (C) is present in at least one phase selected from the group consisting of said continuous phase of the polyamide (A) and said dispersed phase of the polyphenylene ether (B),
wherein said polyamide (A) is exposed on a surface of said shaped resin article so that the surface area of the polya- mide (A) exposed on the overall surface of said shaped resin article is at least 80%, based on the surface area of the shaped resin article, wherein said polyphenylene ether (B) contains relatively high molecular weight polyphenylene ether molecules, each independently having a molecular weight of 200,000 or more, and relatively low molecular weight polyphenylene ether molecules, each independently having a molecular weight of 5,000 or less, wherein the weight ratio of said relatively high molecular weight polyphenylene ether molecules to said relatively low molecular weight polyphenylene ether molecules is 0.35 or less, and the amount of said relatively low molecular weight polyphenylene ether molecules and the amount of said relatively high polyphenylene ether molecules are, respectively, 5% by weight or less and 2% by weight or less, based on the weight of said polyphenylene ether resin (B).

2. The shaped resin article according to claim 1, wherein said polyamide (A) comprises at least two different polyamide components having their respective different viscosities.

3. The shaped resin article according to claim 1, wherein said component (A) comprises polyamide 6,6 and a polyamide other than polyamide 6,6.

4. The shaped resin article according to claim 3, wherein said polyamide other than polyamide 6,6 is polyamide 6.

5. The shaped resin article according to claim 3, wherein said polyamide other than polyamide 6,6 is a polyamide comprising recurring units, each independently represented by the following formula (I):

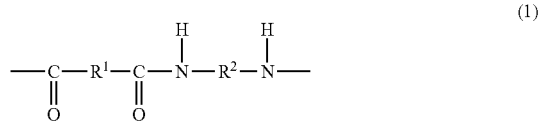

(1)

wherein each of $R^1$ and $R^2$ independently represents a $C_3$-$C_{14}$ alkylene group or a $C_6$-$C_9$ arylene group, with the proviso that $R^1$ and $R^2$ are not simultaneously a $C_6$ alkylene group or a $C_6$ arylene group.

6. The shaped resin article according to claim 1, wherein said polyamide (A) comprises at least one polyamide component having a terminal amino group content of from $1 \times 10^{-5}$ mol/g to $4 \times 10^{-5}$ mol/g.

7. The shaped resin article according to claim 1, wherein said one or more partially hydrogenated block copolymers (C) further include at least one partially hydrogenated block copolymer (C-2) having a number average molecular weight of from 50,000 to 150,000.

8. The shaped resin article according to claim 7, wherein said at least one partially hydrogenated block copolymer (C-1) and said at least one partially hydrogenated block copolymer (C-2) collectively include:

at least one partially hydrogenated block copolymer having a high aromatic vinyl monomer unit content, which is obtained by partially hydrogenating an unhydrogenated block copolymer in which said at least one aromatic vinyl polymer block is present in an amount of from 60 to 90% by weight, based on the weight of said unhydrogenated block copolymer, and at least one partially hydrogenated block copolymer having a low aromatic vinyl monomer unit content, which is obtained by partially hydrogenating an unhydrogenated block copolymer in which said at least one aromatic vinyl polymer block is present in an amount of from 20 to less than 60% by weight, based on the weight of said unhydrogenated block copolymer, and wherein the total amount of the aromatic vinyl polymer blocks present in said hydrogenated block copolymers (C-1) and (C-2) is 30 to 40% by weight, based on the total weight of said hydrogenated block copolymers (C-1) and (C-2).

9. The shaped resin article according to claim 1, which further comprises at least one carbonaceous material (D) selected from the group consisting of a conductive carbon black, carbon fibers and carbon nanotubes, and which is produced by melt-kneading a masterbatch comprising said polyamide (A) having dispersed therein said carbonaceous material (D) with said polyphenylene ether (B), said one or more partially hydrogenated block copolymers (C), and optionally at least one member selected from the group consisting of an additional amount of said polyamide (A) and an additional amount of said carbonaceous material (D).

10. The shaped resin article according to claim 1, wherein said wollastonite particles (E) have at least two different aspect ratios.

11. The shaped resin article according to claim 1, which is a pellet.

12. The shaped resin article according to claim 1, which is an automobile exterior part.

* * * * *